(12) United States Patent
Bitan et al.

(10) Patent No.: US 7,617,193 B2
(45) Date of Patent: Nov. 10, 2009

(54) INTERACTIVE USER-CONTROLLED RELEVANCE RANKING RETRIEVED INFORMATION IN AN INFORMATION SEARCH SYSTEM

(76) Inventors: Elan Bitan, 1050 5th Ave. 8E., NYC, NY (US) 10028; John O'Brien, 32 Nottingham Rd., Short Hills, NJ (US) 07078; Giora Feldman, 43 Shani St., Modi'in (IL)

( * ) Notice: Subject to any disclaimer, the term of this patent is extended or adjusted under 35 U.S.C. 154(b) by 0 days.

(21) Appl. No.: 11/589,267

(22) Filed: Oct. 26, 2006

(65) Prior Publication Data

US 2007/0043723 A1 Feb. 22, 2007

Related U.S. Application Data

(63) Continuation of application No. 11/091,263, filed on Mar. 28, 2005, now abandoned, and a continuation of application No. 11/326,999, filed on Jan. 6, 2006, now abandoned.

(51) Int. Cl.
*G06F 17/30* (2006.01)
(52) U.S. Cl. .............................. 707/3; 707/7
(58) Field of Classification Search .................. 707/3, 707/7
See application file for complete search history.

(56) References Cited

U.S. PATENT DOCUMENTS

| 5,675,788 | A  | * | 10/1997 | Husick et al. ............. 707/104.1 |
| 7,502,785 | B2 | * | 3/2009  | Chen et al. ....................... 707/3 |
| 2003/0220913 | A1 | * | 11/2003 | Doganata et al. ............... 707/3 |
| 2004/0122656 | A1 | * | 6/2004  | Abir .............................. 704/4 |
| 2005/0216443 | A1 | * | 9/2005  | Morton et al. .................. 707/3 |
| 2006/0059144 | A1 | * | 3/2006  | Canright et al. ................ 707/5 |
| 2006/0259476 | A1 | * | 11/2006 | Kadayam et al. ............... 707/3 |
| 2007/0156677 | A1 | * | 7/2007  | Szabo ........................... 707/5 |
| 2008/0104041 | A1 | * | 5/2008  | Bjornson et al. ............... 707/3 |
| 2009/0049481 | A1 | * | 2/2009  | Fellenstein et al. ............ 725/53 |

* cited by examiner

*Primary Examiner*—John R. Cottingham
*Assistant Examiner*—Alexandria Y Bromell
(74) *Attorney, Agent, or Firm*—Ezra Sutton, P.A.

(57) ABSTRACT

The present invention presents an apparatus and system for providing an ability to conduct a secondary search using results provided by a first search capability. This secondary search is integrated with the first search and functions as an added tool or accessory. The present invention allows for user control of search ranking, search viewing and search presentations thus affording more relevant information retrieval. Searchers can dynamically and interactively examine and manipulate the search results to improve relevance and quickly satisfy their search objectives.

28 Claims, 10 Drawing Sheets

INTERACTIVE USER-CONTROLLED RELEVANCE RANKING RETRIEVED INFORMATION IN AN INFORMATION SEARCH SYSTEM

Continuation of application Ser. No. 11/091,263 filed Mar. 28, 2005 now abandoned and Continued on Jan. 6, 2006 as application U.S. Ser. No. 11/326,999 now abandoned

BACKGROUND OF THE INVENTION

1. Field of the Invention

The present invention relates to an apparatus and method for searching for information electronically, possibly over the internet, and more particularly, to a method of improvement to the search process for information after it has been received from a primary database search vehicle, possibly an internet web search engine.

2. Description of the Prior Art

The Internet World Wide Web including private intranet pages ("Web") has been growing at an exponential rate resulting in huge increases in both the volume as well as the variety of available pages of information content. This informational content ("Content") includes any associated viewable pages, shopping websites documents, corporate or other databases, private intranet pages searchable by an instance of a search engine, data files, audio files, graphic files, video files, or other type of files, otherwise known as objects ("Objects").

This significant increase in Content, coupled with the inherently decentralized nature of the Web, has resulted in generating a number of various search engines ("Search Engine") which periodically catalog Content electronically, including on the Web and which may maintain catalogs, indexes and databases of various Content locations. These Search Engines permit searchers to obtain the Web or other addressable locations of various Content in response to search requests submitted by the user, including searches over the Web.

Prior art Search Engines evolved to help searchers navigate through massive amounts of Content, and to locate specific items of interest. The problem these Web Search Engines addressed was searching for specific Content, based upon one or more key words, and/or using Boolean combinations of key words in the search process.

SUMMARY OF THE INVENTION

It is the object of the present invention to provide an improved apparatus and method for providing search results of Content stored on the Web, where these search results have a more valued Relevance when viewed under the direction and control of the searcher.

It is a further object of the present invention to provide the searcher with a means for the interactive manipulation and display of search results received, approximately concurrently, from at least one Web Search Engine.

It is a further object of the present invention to collect search related information and learn from user search interactions, of the interactive manipulation and display of search results variety.

It is a further object of the present invention to provide a means of translating the language, linguistic system, or data format, of the different individual results into a different language, or format, and to then provide these translated results for the interactive manipulation and display from at least one Web Search Engine.

It is a further object of the present invention to provide a means of allowing the user to interactively provide additional keywords that act as seeds for context or cluster points and thereby allow the manipulation and display of results from at least one Web Search Engine.

It is a further object of the present invention to provide the searcher with a means of interactively restricting search results to a homepage or subdomain from at least one Web Search Engine.

It is still a further object of the present invention to allow the user to initiate a search directed to sites which have been selected by the searcher or specifically supplied by the searcher, as well as similar sites.

It is a further object of the present invention to present the searcher with results that breakdown various Web extensions and file types, which results are capable of being manipulated by the user.

It is a further object of the present invention to present the searcher with the ability to select a plurality of pre-defined search formats containing pre-selections of specific search settings to help optimize or certain types of searches.

It is a further object of the present invention to include a secondary, temporary, searchable database for the purpose of interactive manipulation and display of search results which may be dynamically reviewed interactively by the searcher as they vary the non-keyword search input criteria.

It is a further object of the present invention to provide a method for the interactive control and viewing of search results by the searcher.

BRIEF DESCRIPTION OF THE DRAWINGS

Features and advantages of the present invention will become apparent to those skilled in the art from the following description with reference to the drawings, in which.

DETAILED DESCRIPTION OF INVENTION AND THE PREFERRED EMBODIMENTS

Figure 1:
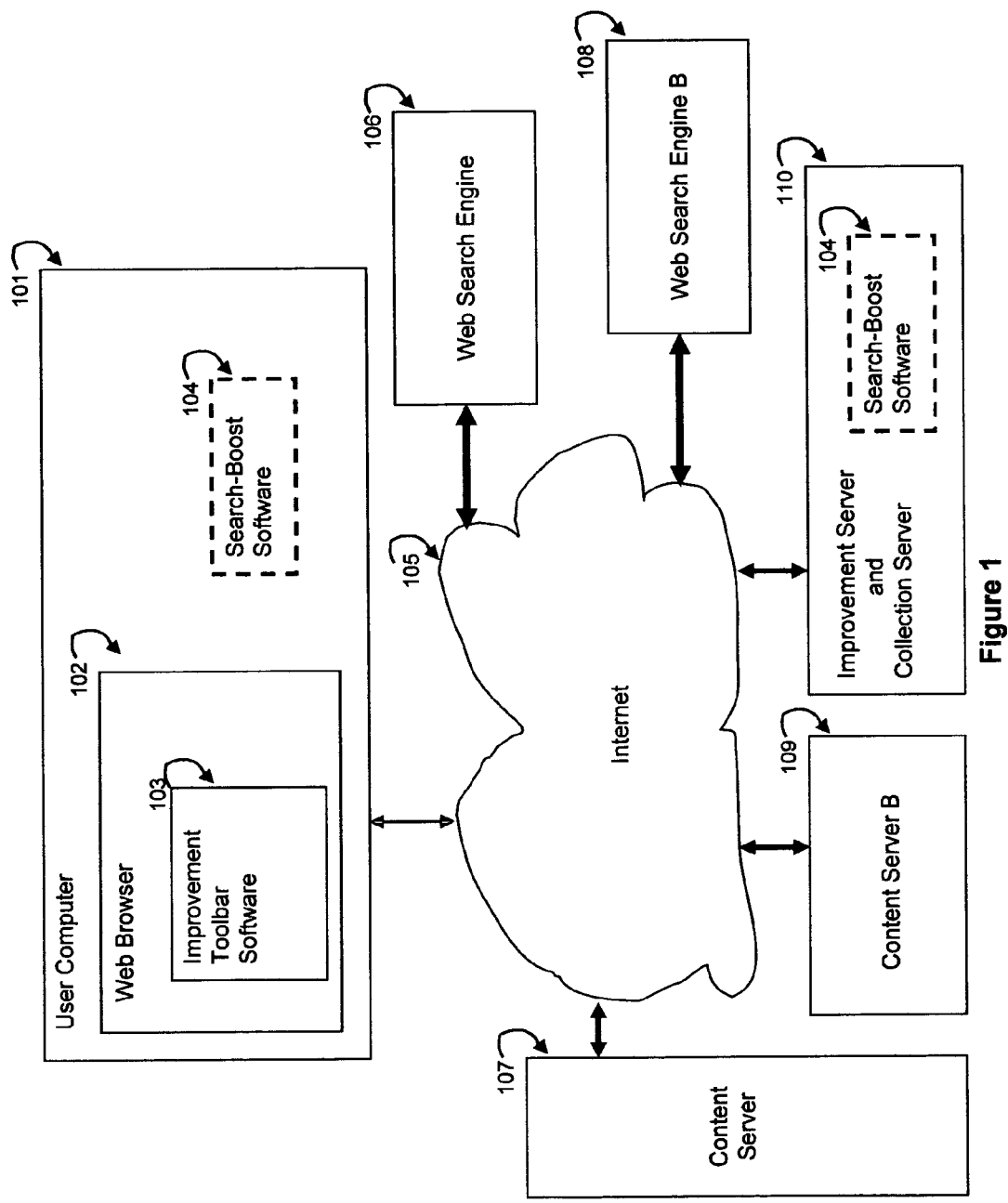
FIG. 1 is a diagrammatic presentation of an apparatus and system for the present invention.

One major aspect of the present invention is an ability to conduct a secondary search using results provided by a first search capability. This secondary search is integrated with the first search and functions as an added tool or accessory. The present invention allows for user control of search ranking, search viewing and search presentations thus affording more relevant information retrieval.

To better appreciate the present invention, we first discuss some deficiencies with the prior art that we seek to correct.

Even after Content sites are located by a Web Search Engine, an additional difficulty occurs in evaluating the relative merit or so called relevance of concurrently located Web pages and Objects. This is due, in some part, to the different intentions that a user may have when initiating a search. For example a user searching with the keywords "hot chocolate" may be looking for one of several popular hot chocolate brand mixes, hot chocolate recipes, a rock band, or even an adult film star. The searcher commences the search with certain intentions, but using the prior art search capability, the searcher can do little to influence how the search results are scored and presented. Relevance ("Relevance") then, may be defined as the relative merit or value of Web pages and Objects concurrently located. This definition includes the understanding that different search users may have a different context in mind when the same keywords are used to search the web for web pages or objects which then carry a rank or figure of merit associated with that specific page.

Web Search Engines typically employ a crawler ("Crawler") or spider program that periodically reads and searches web pages, and searches the internet to locate new web pages, and revisits previously located sites to look for changes. A Crawler that makes a single visit to a specifically selected or identified Web site for the purpose of locating, logging, indexing and/or cataloging specific instances of suggested or derived keywords and multiple keyword combinations, is defined as a directed crawler ("Directed Crawler"); and when operating, it is performing a direct crawl ("Direct Crawl").

New changes or new information about web pages are cataloged and indexed with location information stored into different Web Search Engine controlled databases ("Database"). These databases are then accessed and processed upon receipt of user search criteria.

The Web Search Engine responses involve determining and assigning some importance weighting to each individual search result. It may appear that this score is assigned only in response to the current search. In practice, for many Web Search Engines, the actual page rank is assigned before the search is even requested. Ranks are not assigned in real time, but are computed on batch or stored time intervals and therefore the retrieval is usually very fast for these Web Search Engines. These rankings heavily favor the referred traffic, or visitors, or so called popularity of a page or web site. One could reasonably describe, based on the immediately preceding discussion, that Web Search Engines engage in a pre-ranking ("Pre-ranking") of page scores. All the Web Search Engine results correspond to a specific Web page location, thus, regardless of when the rank, and any other additional scoring criteria, is calculated, this calculation or scoring determines the order in which the aggregate search results ("Results Set") will be presented to the searcher. These Results Sets contain the Uniform Resource Locator, URL ("URL"), the global address of documents and other resources of the Web, for each member of the set.

Each Web Search Engine employs its own method of ranking results for presentation to searchers. The criteria typically used by these Web Search Engines include one or more of the following three techniques.

First, responses to a searcher's queries are often determined by how keywords were included in a web site page or Object by the web site author. Web Search Engine providers often count and use the frequency of occurrence of the author's use of keyword(s).

The problems with the first technique problems include manipulation of search results by web sites that intentionally include certain keywords or intentionally duplicate those keywords in their web pages. Sometimes they use the same foreground and background color so that the page may read normally to the human eye but registers a higher count. Sometimes they may include the extra keywords in meta language descriptions so that it is detected by the Web Site Engine crawler but not the human eye. These actions cause the score associated with these pages to be artificially raised therefore reducing the Relevancy of the overall results.

Second, Web Search Engines sometimes use the combination of location as well as frequency of keywords on a web page as the basis of ranking search results. Location information might be whether the keyword is in a page title, or in the body of text associated with the page, or in the URL. Frequency information would mean the number of times the keyword was present.

The second technique problems include the same problems as the first where the problematic web sites practice the duplicate behaviors in different locations of the page or URL.

Over a hundred companies have come into existence to teach other companies how to improve their firm's page rankings. Often called SEO (Search Engine Optimization) companies, these firms teach strategies that are applied to web site design for the specific purpose of increasing page ranking. Consider how one such company, KeywordRanking.com, describes itself in a March 03 Search Engine Strategies 2005 Conference Guide.

"We were recently confirmed as the world's largest search engine optimization company by Marketing Sherpas's Buyers Guide, topping a list of 120 companies."

With all those firms teaching others how to improve their page ranking, there should be no doubt that the page scoring and ranking process is not a level playing field.

Third, Web Search Engines may also rank search results based on the number of other Web pages and/or number of heavily trafficked web pages that include hypertext links to the page under ranking consideration.

The third technique introduces three types of bias and inconsistency into the page ranking and Relevancy process
 (i) new web sites are at a strong disadvantage as they do not have the breadth of referrals and links as pages that have been in existence for a longer time—even though these new sites might be of higher Relevance than the older sites they will be ranked lower
 (ii) a web site owner can basically 'link spam' their site with multiple links from many sites and many high traffic sites. This practice results in generating a much higher score for the site then it would otherwise merit; and
 (iii) the issue of searcher context, discussed previously in earlier is ignored by relying on heavily trafficked pages.

Some Web Search Engines have declared a very complex process to determine search rankings. Consider the following quotation of how Google describes it's ranking process from the Google web site, (http://www.google.com/corporate/tech.html).

"Traditional search engines rely heavily on how often a word appears on a web page. Google uses PageRank™ to examine the entire link structure of the web and determine which pages are most important. It then conducts hypertext-matching analysis to determine which pages are relevant to the specific search being conducted. By combining overall importance and query-specific relevance, Google is able to put the most relevant and reliable results first."

"PageRank Technology: PageRank performs an objective measurement of the importance of web pages by solving an equation of more than 500 million variables and 2 billion terms. Instead of counting direct links, PageRank interprets a link from Page A to Page B as a vote for Page B by Page A. PageRank then assesses a page's importance by the number of votes it receives."

"PageRank also considers the importance of each page that casts a vote, as votes from some pages are considered to have greater value, thus giving the linked page greater value. Important pages receive a higher PageRank and appear at the top of the search results."

The problem with such an intensive Pre-ranking approach is that there is no mechanism for a searcher to further investigate the search Results Set that were provided to the original search request. If a searcher wishes to further investigate or explore those results they must review them in the exact order determined by the Web Search Engine. As Google clearly states, it's page ranking process involves "solving an equation of more than 500 million variables and 2 billion terms" and Google, as well as the other Web Search Engines, have provided no means to involve searchers to participate in influencing how these rankings are generated or viewed or examined.

Those skilled in the art can quickly appreciate that the larger the Database becomes, the larger the problem to rank results in real time. Even if the Database is comprised of smaller Databases that then need to have their results aggregated, it is still a problem. Thus, the prior art solution to this problem is Pre-ranking.

However, the massive size of the Web Search Engine Database combined with the practice of Pre-ranking page scores or page ranks creates an additional problem if one wishes to derive more search Relevance by additionally filtering results using an additional list of criteria. For example:

Did the individual result contain a .PDF file?
Did it contain a .DOC file?
Did it contain a .PPT file?
Did it contain a .PS file?
Did the URL have a .edu file extension?
Did the URL have a .gov file extension?
Did the URL have a .com file extension?
Was the keyword or keywords found on the homepage?
Was the site hosted in the USA?
Etc for other useful criterion To consider such criteria in advance in the context of a Pre-ranking approach would necessitate either a very large multiplier effect on the size of the massive database, or necessitate that a mini-database or table be included within each member of the Web Search Engine's Database. To accomplish either, would involve significant processing time and additional data storage space. Thus, for a period measured in years, none of the major—or minor—Web Search Engines have been able to offer searchers a capability of using a plurality of simultaneous filters in their searches. This has been a lost opportunity and an efficiency problem for searchers, who pay for page after page of unwanted results using the currency of their time, while receiving items of low Relevancy.

Prior art implementations treat multiple considerations, such as multiple keywords, and multiple items from the earlier list, as problems or equations that can yield a single quantitative result. There is no example or instance of being able to present results that include the use of multiple filters on results. Consider the Web Search Engines Google, MSN, and Yahoo in turn.

Google's advanced search capability, is seen at URL location (http://www.google.com/advanced_search?hl=en). Google permits a filtering that supports including only .pdf files. Or including only .doc files. Or including only .xls files. And the like. But Google does not offer this kind of filtering on more than one consideration at a time. The technological constraint on why Google can not offer consideration of multiple dimensions was explained earlier.

Microsoft's advanced search capability, is seen at URL location (http://search.msn.com?qb=1). Microsoft allows users to select via a graphical interface a point on each of three continuums: (i) updated recently—static, (ii) very popular—less popular, and (iii) approximate match—exact match. The results of these selections are used to quantify a single aggregate score. But Microsoft does not offer this kind of filtering on more than one consideration at a time. The technological constraint on why Microsoft can not offer consideration of multiple dimensions was explained earlier.

Yahoo's advanced search capability, is seen at URL location (http://search.yahoo.com/search/options?fr=fp-top&p=). Yahoo allows Site/Domain selections of the type where the searcher may select one only. Yahoo permits a filtering that supports including only .gov files. Or including only .edu files. Or including only .org files. And the like. But Yahoo does not offer this kind of filtering on more than one consideration at a time. The technological constraint on why Yahoo can not offer consideration of multiple dimensions was explained earlier.

Also considered as a prior art solution is U.S. Pat. No. 6,012,053, the Lycos ("Lycos") patent. Lycos is another example of reducing various user input into a single quantitative result. This result is applied at the Web Search Engine. For example Lycos states in the patent "Given the relevance factors and the search results, each item which matches the query is given a score according to the relevance factors. In order to perform this scoring, the record for the item in the database is analyzed to determine whether its attributes match the criteria for the factor in order to receive the weight associated with the factor."

Thus it is clear that the relevance factors are weighed in some manner and aggregated into a common score. This approach does not support this kind of filtering on more than one consideration. The technological constraint on why Lycos can not offer consideration of multiple dimensions was explained in earlier.

It is also clear that Lycos teaches an invention to be practiced within the Web Search Engine itself. From Lycos, "By implementing a search engine in this manner, the user can control the ranking and presentation of documents that result from the search, based on the user's understanding of the factors that may affect the relevance of the documents to the query."

Lycos teaches how to build a Web Search Engine. They allow user control over some parameters but these controls are submitted back to the Web Search Engine. As Lycos states this is a search of documents and applying relevance factors to documents. While it is true that varying the Lycos's "relevance factors" will influence the results of a query, it is in fact still a different physical query. There is nothing described in the Lycos architecture that would act as a temporary database and thereby support searcher manipulation of Web Search Results. There is no ability to support interactive evaluations of results short of submitting a new physical query. There is no ability to dynamically examine the search results. There is nothing to support the interactive evaluation of results by the searcher.

In all four cases, Lycos, Google, MSN, and Yahoo, once a set of results is delivered, there is no way to further examine those results with any sort of searcher criterion. Those results are downstream from the Web Search Engine and as such they can not be manipulated, researched, resorted, or reconsidered in the light of the searcher's perspective. They are fixed. To make any further examination necessitates throwing those results away and commencing a new search. There is no dynamic ability to examine results with respect to different criterion. There is no interactive way for searchers to look at these results. There are no iterative manipulations that searchers can perform. Any additional consideration on the part of the searcher, other to go forward or backward in the list of results, necessitates commencing a new search. Even, the "search within results" feature offered by Google actually discards current results and begins a new search.

Web Search Engine methodologies deliver a 'fire and forget strategy' when providing search results. The initial search Results Set are ruled by a ranking methodology that is fixed and immutable. Web Search Engines typically provide up to the first 1000 results as a maximum limit, and do not allow searchers to participate in how searchers want to view how those rankings are organized and presented. Should a searcher act to alter even a single search criterion, it will cause the first Results Set to be discarded and a second search to be acted upon and the new Results Set will be presented. The searcher, therefore, has no way to review the first 1000 results except to review them serially in the exact order determined for view by the specific Web Search Engine.

Regardless of how complex a particular Web Search Engine defines for their ranking of results, their ranking methodology and associated viewing order of results is closed. Searchers have no participation in how the search items they requested are to be considered, ranked, and viewed, and the consequence of this is problematic. These problems are summarized as follows:

1. Searchers must serially page through a plurality of results, many with little Relevancy, to investigate the range of the Results Set received from a Search Engine. These unresponsive or unwanted responses to their searches are reviewed in the hope of finding a responsive element with Relevance from the list.
2. Any attempt to "search within results" will discard the current results and create a new search with different search results. Thus if a potential item that is being sought is buried somewhere in the first combined set of responses, typically 1000, any attempt to get to that item more directly, or more quickly, will result in a different set of search results being generated and offered.
3. Newer web sites are at a strong disadvantage compared to older ones as they do not have the breadth of referrals and links as pages that have been in existence for a longer time. Consequently, they have a lower ranking independent of Relevancy.
4. Web sites which 'link spam' their site with multiple links from many sites and many high traffic sites achieve a higher and undeserved ranking than sites with more Relevancy.
5. Searchers have a context within which they perform searches. These contexts grow, evolve, and mature as they review material supplied from the Web Search Engine. To deny searchers an ability to interactively fine tune, explore, and investigate what is in their aggregate search results—other than reviewing the results serially—is to short change and compromise what otherwise would be searching with a high degree of Relevance.

These things have been and continue to be problems for searchers.

The present invention includes a secondary, temporary, searchable database for the purpose of interactive manipulation and display of search results. These results may be dynamically reviewed interactively by the searcher as they vary the non-keyword search input criteria. This secondary database may be comprised of the Results Set provided by the Web Search Engine in response to any keywords provided by the searcher. This set is then parsed and scored using search setting inputs provided by the user, then sorted and formatted for display purposes. Varying the non-keyword search input criteria will cause the invention to be responsive to a new set of searcher defined Relevancy criteria and the Results Set will be re-sorted and re-presented to the searcher without making any request to the Web Search Engine. Those skilled in the art will appreciate that the invention is not limited to internet Web Search Engines, but rather includes the general case of providing higher relevance for pre-ranked, massive databases.

The present invention includes a unique and novel process for conducting Web based searches through a Web Search Engine by providing a method for the interactive control and viewing of search results by the searcher. This interactive viewing allows searchers to focus upon search results with more Relevance and find desired results more quickly.

In an embodiment of the present invention, a searcher enters at least one keyword into a conventional Web Search Engine input box. Once the searcher submits the initial search query, and then activates the present invention, it then further interrogates at least one Web Search Engine and produces an expanded list of relevant Web locations based upon the searcher's search settings and the initial search term(s). The searcher may then interactively examine, investigate, re-prioritize, re-weight, specify Relevance criteria, specify Object exclusions or Object inclusions, specify domain location constraints, and specify other individual constraining criterion, on the original search results without further engaging any Web Search Engines.

In the following description, reference is made to the accompanying drawings which form a part hereof, and which illustrate several embodiments of the present invention. It is understood that other embodiments may be utilized and structural and operational changes may be made without departing from the scope of the present invention.

For simplicity and illustrative purposes, the principles of the present invention are described by referring to one of the preferred embodiments. The invention includes a customized Search Engine indexing system, a browser operating with the Search Engine, and a user controller mechanism for ranking search results by Relevance. However, one of ordinary skill in the art would readily recognize that the same principles are equally applicable to, and can be implemented in, other informational databases, and that any such variation would be within such modifications that do not depart from the true spirit and scope of the present invention. For example a special purpose search system that ranked and returned search results about genome information, that resides on a biological research institute database, might benefit from the principles taught in the present invention.

To overcome the limitations in the prior art, the present invention discloses an apparatus and method for providing search results to the searcher that have more valued and personalized Relevance. This apparatus and method use the search results from existing Web Search Engines and manipulate the results provided by those products using the guidance, experience, and direction of the searcher.

FIG. 1 is a diagrammatic presentation of an apparatus for performing the new method of user controlled search presentation for more relevant information retrieval. This figure illustrates a user computer 101 in which the preferred embodiments are implemented. The internet 105 includes multiple connections including more than one Web Search Engine 106 and 108 and more than one Content server 107 and 109 as well as a User's computer 101 and an Improvement server 110 used for required download activities and as a collection server.

In the embodiments that are disclosed later, there are two ways for a searcher to initiate the use of this invention.

In the first method of invention activation, a searcher inputs one or more keywords on his or her user computer 101 and initiates a search using a conventional Web Search Engine 106. This requested search, results in the receipt of search results, possible many hundreds, or more, about various different Content servers, 107 or 109 or many others, for example. These results are delivered over the internet 105 and displayed through a conventional Web browser 102. These results are comprised of various Web page Content locations and are delivered from the Web Search Engine 106 in a fixed manner thought to be convenient by the Web Search Engine 106 for review and display through the browser 102 on the user's computer 101.

Once these search results have been received at the user's computer 101, the searcher may elect to improve upon these search results by seeking to review the results in a manner that provides more Relevance to the user than provided by a fixed ranking scheme rigidly controlled by the Web Search Engine 106. To achieve this increase in Relevance, the searcher activates the improvement icon depicted on the improvement toolbar, which is displayed on the user's browser 102, and is managed by the improvement toolbar software 103. This activation causes the search-boost software 104 to switch from stand-by operation to full operation. The search-boost software 104 is discussed in detail later below in conjunction with FIG. 2 below, and later in conjunction with FIG. 3 in still later below.

The user computer 101 could be any variety of standard commodity computers, or better, for example a commonly sold personal computer that might be internet capable and might be equipped with a browser type software, for example.

In the second method of invention activation, a searcher inputs one or more keywords on his or her user computer 101 directly into the entry window on the Improvement Toolbar displayed on the Browser 102 and managed by the improvement Toolbar Software 103.

In either activation, via the steps described in the paragraphs above, of the invention the search-boost software 104, is discussed in more detail in the FIG. 2 discussion that follows below, operates the same. Note, however, that in FIG. 1 the search-boost software 104, designated by dotted lines in FIG. 1, is purposely shown in two different places; within the User Computer 101 and within the Improvement Server 110. This search-boost software performs the same role in either location but is present in one location or the other depending upon which embodiment of this invention is implemented. Suggestions on where to locate the Search-boost software are discussed later.

Figure 2:
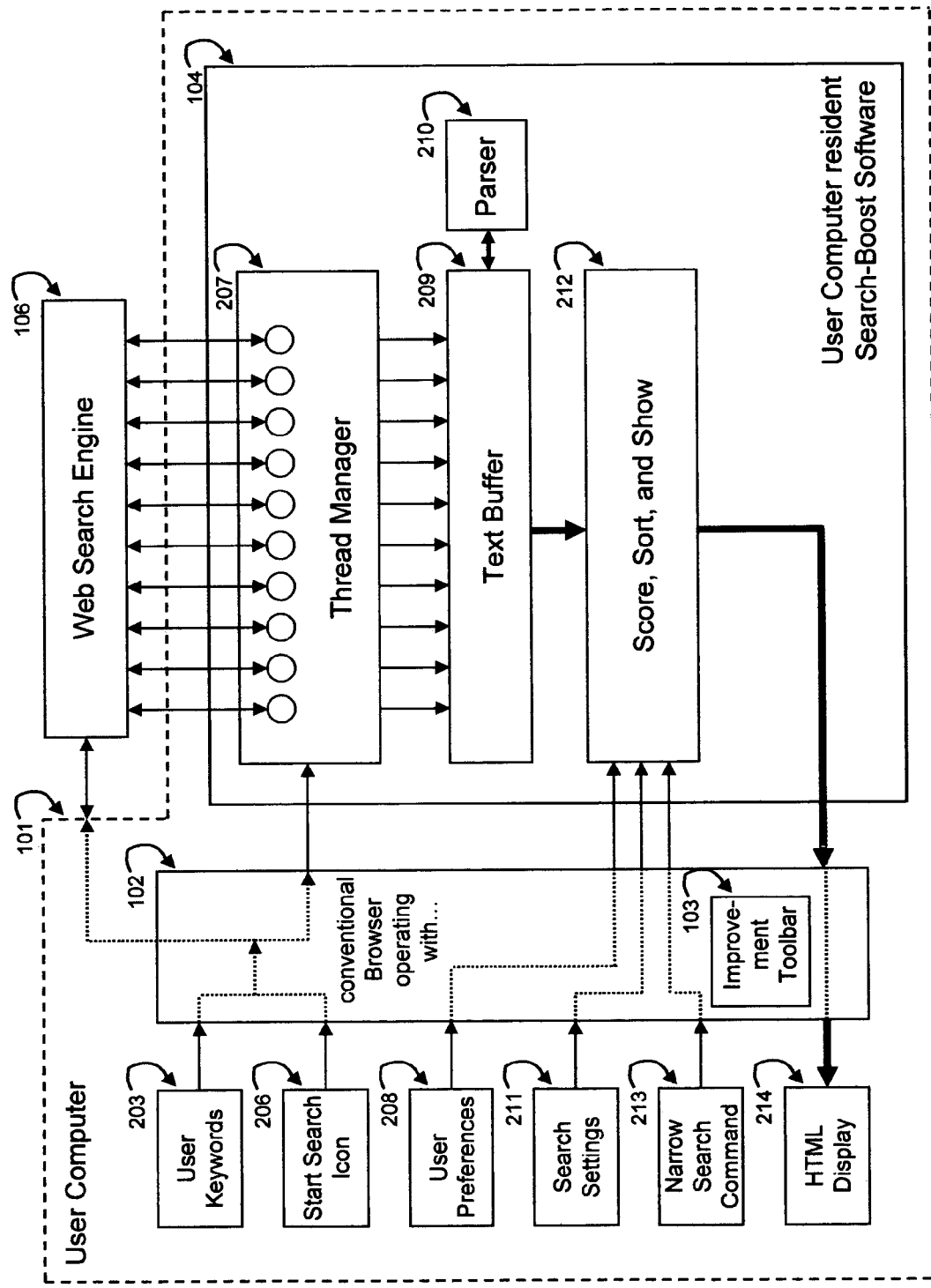
FIG. 2 is a block diagram of an embodiment of the improved search apparatus and system, with the software located on the User's Computer.

FIG. 2 represents a block diagram of a preferred embodiment of the present invention with all of the search-boost software 104 located on the User Computer 101.

Figure 3:
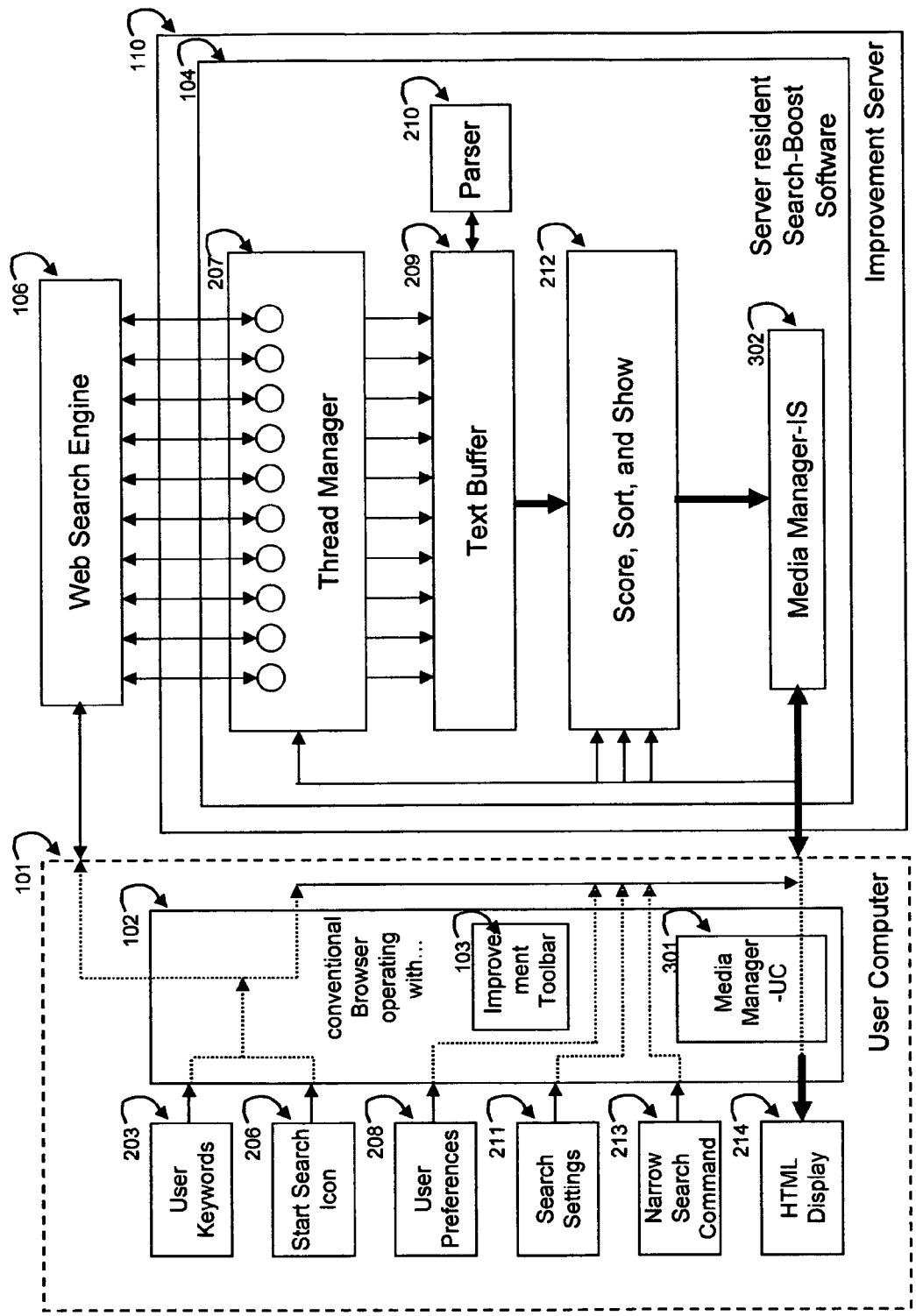
FIG. 3 shows a block diagram of a search apparatus and system, with software located on a remote server.

FIG. 3 is another embodiment block diagram of the present invention with the majority of the search-boost software 104 located on a remote Improvement Server 110 computer.

FIG. 2 showing a block diagram of an embodiment of the improved search apparatus and system, with the software located on the User's Computer, is a preferred embodiment. In this embodiment the Search-boost software 104 is resident on the User Computer 101. The Search-boost software 104, includes the Thread Manager 207, the Text Buffer 209, the Parser 210, and the Score, Sort, and Show routine 212. In addition, the Search-boost software 104 also manages User Keywords, User Preferences, User search Settings, and acts on receipt of other user commands. This is discussed below.

After the search-boost software 104 is engaged by either means, described earlier, it initiates one or more requests to at least one search engine. The first request returns results that indicate how many total results may be obtained via the first sequence of paging requests. For example Google currently supports up to 1000 results when their page display and paging sequence is extended to the maximum. This is the case even though Google reports that the so called results may be in the millions. There may be a million or more results across Google's Database, but Google packages a maximum of 1000 individual results in the return of total results. In practice, these 1000 results often reduce further to considerably fewer than 1000 once Google's duplicates responses are eliminated.

The Thread Manager 207 is a software module that is responsible for initiating, managing, and receiving multiple search requests to at least one Web Search Engine. These requests are made over the internet nearly simultaneously, and are processed nearly simultaneously—depending on the response pattern of the Web Search Engine. The Thread Manager 207 accepts the user keywords as inputs and formats these keywords into multiple requests. A complete description of the various process steps are discussed later in conjunction with FIG. 4.

It uses the technique described as follows to determine the exact number of requests to make. Using Google as an example of a Web Search Engine, first set the number of responses per page to 100 using Google's preferences selection. Then perform a search on Google. Then select the largest result page, page 10 for Google. Doing a recent search for 'hot chocolate' the first request response pages say 1 to 100 of 7,350,000. This maximum number is determined by selecting the last numbered choice on Google's first search result page. Submitting this request for page 10 shows that page 10 displays 801 thru 804. Google will provide only 804 hits or URL sites of the 7,350,000 it has. As a practice they limit to 1000 results per request. Once the number of results are known, the Thread Manager 207 then posts a sufficient number of requests to completely capture up to 1000 results. simultaneously. In this example it is a total of 9 requests. The Thread Manager, then, running within the search-boost software 104 would issue and additional 7 search requests to cover the remaining 700 results, since the first 100 were captured in with the first request, and the last 4 were captured with the result page 10 request. These additional requests are issued over the internet by the Thread Manager 207 and managed as multiple threads issued approximately. Responses from the Web Search Engine(s) are output to the Text Buffer 209.

Figure 6:
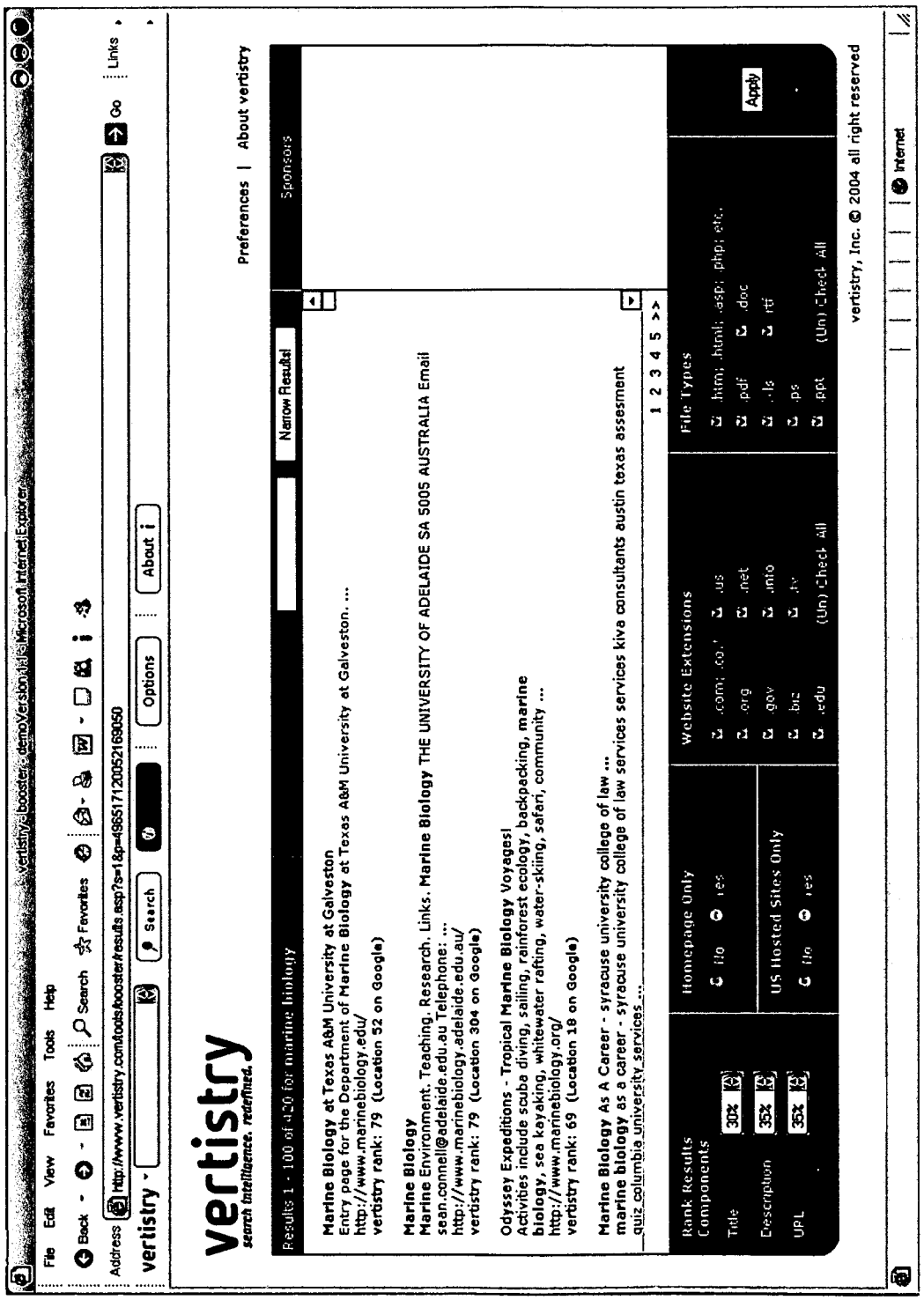
FIG. 6 depicts an example of a searcher input screen in the present invention.

The Web Search Engine 106 multiple request responses are processed by the Thread Manager 207 and sent to the text buffer 209 for staging. In turn, all of the multiple request responses are filtered through a parser 210. The Parser 210 strips out the Web Search Engine specific formatting information, including any duplicates, and formats the results into a common convenient display format. The role of the parser is to take the Search Engine results and remove advertisements, save the website description text, save the website title text, save the website URL text, discard the Search Engine's page flow controls, discard the other Search Engine links and hyperlinks, and discard the Search Engine's formatting of title, text, URL. The saved text is then arranged into formatted proforma display. An example of this formatted text is depicted in FIG. 6. These formatted results are then passed back to the text buffer 209 and moved under the control of the Score, Sort and Show 212 module.

The Score, Sort and Show 212 module is a software module that is responsible for scoring and filtering, then sorting, then displaying multiple search requests results received from at least one Web Search Engine. First the total results received are scored and filtered according to the current settings directed by the searcher. Then these results are sorted by score. Finally, the sorted results are formatted into an HTML display format and then passed along to the browser 102 for display to the searcher. We discuss each of these activities below in sequence.

In terms of inputs the Score, Sort and Show 212 module receives and stores inputs regarding the User Preferences 208, the Search Settings 211, and the narrow the search command 213.

The searcher controls the Relevance ranking of the present invention by means of his or her control of the search settings 211. These include, but are not limited to, the following parameters.

| Title | x % |
|---|---|
| Description | y % |
| URL | z % |
| | 100% |

The Search Settings 211 allow the searcher to specify any combination of numbers, x+y+z, which are then transformed to add up to 100%. These parameters are used to weight the importance of finding the keywords under search, in the page Title, Page Description, or Page URL name.

In general, the scoring methodology starts with the value of three different parameters or measures. The value of each measure is provided by the searcher and then the scoring algorithm in the Score Sort and Show Module 212, computes the score of each measure as a function of two major parameters: (1) the location of the entered keywords in relationship to the target text, and (2) the size of the entered keywords as part of the total size of the text for that measure. In addition, there is factor, 0 to 0.999 which is applied on a measure by measure basis if that measure is not an exact match to the keywords. If it is an exact match the factor is 1. The three measure scores are then aggregated, and one final factor is applied to the aggregated score causing a reduction for the number of levels that are present in the URL. Note that throughout this process, no duplicates will be calculated. Duplicate entries are discarded from both consideration and presentation to the searcher. Also, in terms of scope throughout these calculations, if the total length of the title measure is less than 32 characters, then the method of the present invention considers it as 32, and do all scoring as if it were 32 characters long. This helps avoid short names for titles getting a very high score and therefore causing insufficient differentiations. This also obviates title spammers, a practice that favors short names.

In a preferred embodiment of this transformation the scoring works as follows. Searchers are allowed to enter from 0 to 10 for each of the three measures discussed. By example, suppose a searcher selects 3 of 10 for the keyword in a page title, 8 of 10 for the keyword in the page description, and 2 of 10 for the keyword in a page URL. The total points assigned by the searcher was 13 or 3+8+2. Each parameter is then converted to a percentage 3/13 or 23.1%, 8/13 or 61.5% and 2/13 or 15.4%.

As described earlier each of the three measures are then assigned a maximum number of points relating to the % assigned in the transformation. This is achieved by multiplying the percentage score for each measure by 100 and practicing rounding so that the numbers exactly add up to 100. In this specific example, Title=23 maximum points, and these points are defined as the TitleTotalRank ("TitleTotalRank")

Description=62 maximum points, and these points are defined as the DescTotalRank ("DescTotalRank")

URL=15 maximum points, and these points are defined as the URLTotalRank ("URLTotalRank")

Next, the three measures are scored individually and then aggregated into an overall score, which is then adjusted according to one additional parameter. Earlier we discussed the scope of the search function. Earlier we discussed how to get the total maximum rank for each measure. In the next few paragraphs we discuss exactly how the individual rank scores are each reduced, and how an overall aggregate score is generated.

The ExactMatchFactor ("ExactMatchFactor"), is a ratio of the numerator, the total number of keyword occurrences in the text found in the particular (Title, or Description or URL) target measure, divided by the denominator, the number of entered keywords (N) and add 1 yielding (N+1). This ratio is used to reduce that particular measure score accordingly, by multiplying the measure score by this ratio. For example if the entered keywords were "Hot Chocolate"—and these words both existed in the text (not exact match), the ratio is (2/3=0.67% ExactMatchFactor). The ExactMatchFactor for each measure is recalculated and applied to the non-exact match occurrences for the same measure.

The individual score of each measure will now be reduced depending on the location of the entered keywords in relationship of the target text of the particular measure and the size of the entered keywords as part of the as part of the total size of the text for the individual measure. This is done according to the following formulae.

Title formulae:

exact match -> TitleRank = TitleTotalRank * Sfactor* Lfactor* 1
if not exact -> TitleRank = TitleTotalRank * Sfactor * Lfactor*ExactMatchFactor
where :
if the length of the keyword = length of the target title, that is if it is an exact match, then the value of the function is set 1.
If not, we check how big the length of the keyword is comparing to the length of the target title length. In that checking process
    If the length is bigger than 80% then Sfactor =0.95.
    If the length is bigger than 60% then Sfactor =0.9.
    If the length is bigger than 40% then Sfactor =0.85.
    If the length is bigger than 20% then Sfactor =0.8.
    If it's less than 20% then Sfactor =0.75.
we use the first occurrence of keyword in the target title
    If it's 1 (in the beginning of the target, then LFactor = 1
    If it's in the first 20% of the target then LFactor =0.95
    If it's in the first 40% of the target then LFactor =0.9
    If it's in the first 60% of the target then LFactor =0.8
    If it's in the last 20% of the target then LFactor =0.75

Description formulae:

```
exact match -> DescRank = DescTotalRank * Sfactor*LFactor *1
if not exact -> DescRank = DescTotalRank * Sfactor*LFactor*
ExactMatchFactor
where :
For the Description target we calculate the length of all the occurrences,
even if they are duplicated, and apply the following rules to the total
length of the keywords. If the length of the keyword = length of the target
description, that is if it is an exact match, then the value of the function is
set 1.
If not, we check how big the length of the keyword is comparing to
the length of the target description length. In that checking process
    If the length is bigger than 80% then Sfactor = 0.95.
    If the length is bigger than 60% then Sfactor = 0.9.
    If the length is bigger than 40% then Sfactor = 0.85.
    If the length is bigger than 20% then Sfactor = 0.8.
    If it's less than 20% then Sfactor = 0.75.
we use the first occurrence of keyword in the target description
    If it's 1 (in the beginning of the target, then LFactor = 1
    If it's in the first 20% of the target then LFactor =0.95
    If it's in the first 40% of the target then LFactor =0.9
    If it's in the first 60% of the target then LFactor =0.8
    If it's in the last 20% of the target then LFactor =0.75
```

URL formulae:

```
exact match -> URLRank = URLTotalRank * Sfactor* Lfactor *1
if not exact -> URLRank = URLTotalRank *
Sfactor *Lfactor*ExactMatchFactor
where :
if the length of the keyword = length of the target URL, that is if it is an
exact match, then the value of the function is set 1.
If not, we check how big the length of the keyword is comparing to
the length of the target URL length. In that checking process,
    If the length is bigger than 80% then Sfactor = 0.95.
    If the length is bigger than 60% then Sfactor = 0.9.
    If the length is bigger than 40% then Sfactor = 0.85.
    If the length is bigger than 20% then Sfactor = 0.8.
    If it's less than 20% then the value of the Sfactor is set to 0.75.
we use the first occurrence of keyword in the target URL
    If it's 1 (in the beginning of the target, then LFactor = 1
    If it's in the first 20% of the target then LFactor =0.95
    If it's in the first 40% of the target then LFactor =0.9
    If it's in the first 60% of the target then LFactor =0.8
    If it's in the last 20% of the target then LFactor =0.75
```

The three individual measure scores, for title, ie the TitleRank; for description, ie the DescriptionRank; and for URL ie the URLRank, calculated earlier, are then added into one score, and one final reduction factor is applied to this aggregated score. This final reduction accounts for the number of levels that are present in the URL. This is determined by simply counting how many '/' characters are present in the URL. For each "/", or expressed differently, for each level down from the home page we reduce the total aggregated score by 10%.

The impact of this scheme is that the searcher has significant control over this rank weighting, as the searcher may vary the weights of any or all of the three factors and can use this ranking control to view the search results interactively and dynamically without involving a Web Search Engine. If a searcher is looking for a specific website the searcher may heavily weight the URL measure and more quickly surface sites that might meet the search intention. If a searcher is more interested in the content, finding a quotation for example, then the searcher could reduce the weights of URLs and Title page measures, and significantly raise the weight associated with the description text measure, and more quickly identify sites that better match the searcher's search intention. Final scores for a specific URL reference are added across the three parameters and expressed as an aggregate percentage. The closer a score is to 100% the more Relevance it has.

An alternative embodiment of the ranking or scoring criteria is to use a so called meta search ("Meta Search") approach and apply it to increasing the score of an individual result. Meta Search capabilities have existed for a while where the objective is to almost simultaneously query a plurality of Search Engines with the same search term. In this alternative embodiment for scoring the present invention uses the Meta Search approach for scoring purposes only. The searcher selects the desired search engine and initiates the search. However, in addition to going to that Search Engine for results, the present invention using this embodiment also goes to a plurality of other Search Engines with the same search term. These additional results are used to influence scoring or ranking only. If the selected Search Engine results also occur in one of the other Search Engine results, then that specific result has its score adjusted or boosted by a predefined amount or algorithm. In practice the examination of alternate Search Engine results uses the highest ranked results within the first 100 results and uses a score boost associated with finding a selected Search Engine result within the first 100 of an additional Search Engine as a 10% increase in that result's score.

Those skilled in the art can appreciate that the numbers suggested in the practice of this invention are numbers that were found to be effective and are not suggested to limit the concept or application or scope of this alternative embodiment.

The filtering activity of the Score, Sort and Show 212 module is now discussed.

The searcher also controls the Relevance ranking of the present invention by means of his or her filtering of either the website extension search settings 211, or the file type search settings 211. This control is dynamic and interactive and the searcher may adjust these Relevancy rankings in real time and invention would be responsive to these adjustments without a necessity to go back to the Web Search Engine.

Filtering includes or excludes certain website extensions from ranking and display. If selected, all websites that conform to that specific website extension will be included in the presented results. Not selecting a specific website extension does not discard any conforming items from future consideration or manipulations or selections from that particular Results Set. There is nothing mutually exclusive about selecting a specific website extension, that would exclude simultaneous consideration of other specific website extensions. Prior art does not allow for selecting more than a single criterion at a time to add as a search constraint; selecting another search constraint necessitates performing another search. The prior art does not allow dynamic, interactive, re-searching a set of search results. Searchers would benefit from being able to manipulate results by including or excluding certain website extensions. These website extensions include, but are not limited to, the following:

.com
.org
.net
.biz
.edu
.gov
.us
.tv

Filtering includes or excludes certain file types from ranking and display. All websites that conform to that selected specific file types will be included in the presented results.

Not selecting a specific file types does not discard any conforming items from future consideration or manipulations or selections from that particular Results Set. There is nothing mutually exclusive about selecting a specific file type, that would exclude simultaneous consideration of other specific file types. Prior art does not allow for selecting more than a single criterion at a time to add as a search constraint; selecting another search constraint necessitates performing another search. The prior art does not allow dynamic, interactive, re-searching a set of search results. Searchers would benefit from being able to manipulate results by including or excluding certain file types. These file types include, but are not limited to, the following:

.html, htm, asp, php., etc.
.pdf
.doc
.ppt
.xls
.rtf
.ps

There is nothing mutually exclusive about selecting specific website extensions or file types, which would exclude simultaneous consideration of other website extensions, or file types. The set of website extensions filters and file types filters are collective referred to as Filtering Elements ("Filtering Elements").

The searcher also controls the Relevance ranking of the present invention by means of his or her filtering of either the website extension search settings 211, or the file type search settings 211.

In addition, the utility of providing filter capabilities, the present invention also includes providing filtering information by providing frequency annotations for each filter. Filter frequency annotations ("Filter Frequency Annotations") is defined as making and displaying a frequency count of different filter elements for a Results Set. For example, if there were 508 members in the Results Set and 26 of them had PDF files references, then the number 26 would be displayed next to pdf. In similar fashion, a frequency count would be displayed for every Filtering Element.

Filter Frequency Annotations are also considered to be hyperlinks, so that the display of search results includes a hyperlink for every Filtering Element. For example, that there are 16 individual results with .xls files in his or her Results Set, that searcher could click on the number 16 next to xls and this would cause the results of all 16 individual results to be displayed. This resulting display would be in the same format as the display of the Results Set, an example of which is depicted in FIG. 6, except the previous Results Set would be replaced on the screen with as many of the 16 results that included .xls files. The searcher would be free to scroll or page down to review the remaining results.

The sorting activity of the Score, Sort and Show 212 module is now discussed.

The sorting activity of the Score, Sort and Show 212 module is designed to take the scored Results Set and order them according to the criterion of the percentage score, from highest percentage to lowest percentage.

The show or display activity of the Score, Sort and Show 212 module is now discussed.

The display activity of the Score, Sort and Show 212 module is a software module designed to take the formatted, scored, sorted Results Set and convert them to an acceptable display format, like HTML, for example, when communicating with Browser 102.

A substantial advantage of the method according to the present invention becomes evident at this point. First, the Score, Sort and Show 212 module already has a substantial number of items in the Results Set. These results are already sorted to the searchers requested search settings 211. The searcher may interactively view these results without going back to the Web Search Engine 106. In addition, the searcher may alter the search settings 211 and immediately review the new results without going back to the Web Search Engine 106.

In addition, the searcher also controls the Relevance ranking of the present invention by being able to additionally specify three additional conditions:
 i. Whether or not the rank results are to be confined to URLs that contain only homepage and sub-domains
 ii. Whether or not the keywords should be an exact match
 iii. Whether or not to constrain the results to websites hosted in specific geographical locations.

Additional search control and reviewing may be exercised by using the Narrow the Search 213 command. This facility offers the searcher an input window where additional keywords may be entered and will be used to search within the particular existing set of results. This control is dynamic and interactive and the searcher may adjust search within results in real time and invention would be responsive to these adjustments without a necessity to go back to the Web Search Engine.

Another substantial advantage of the present invention includes the physical arrangement of how the user can communicate search settings intentions into the search process. The prior art process does not support the rich search setting parameters, depicted in FIG. 6 and discussed shortly below, The prior art does not support the Filtering Elements nor the Filter Frequency Annotations, discussed in paragraphs earlier. All of these search capabilities are supported by the present invention. In addition, the prior art process relegates search display preferences to a screen input form that is one or two clicks away receiving searcher input. The present invention optionally provides for accepting all searcher inputs on a single main display screen or so called main page.

An example of the searcher input screen is shown in FIG. 6. It is not intended to specify all possible useful search criteria. It is understood that this example includes, but is not limited to, the criteria shown. This example is presented to demonstrate the approach of allowing searcher input on the main screen.

Figure 4:
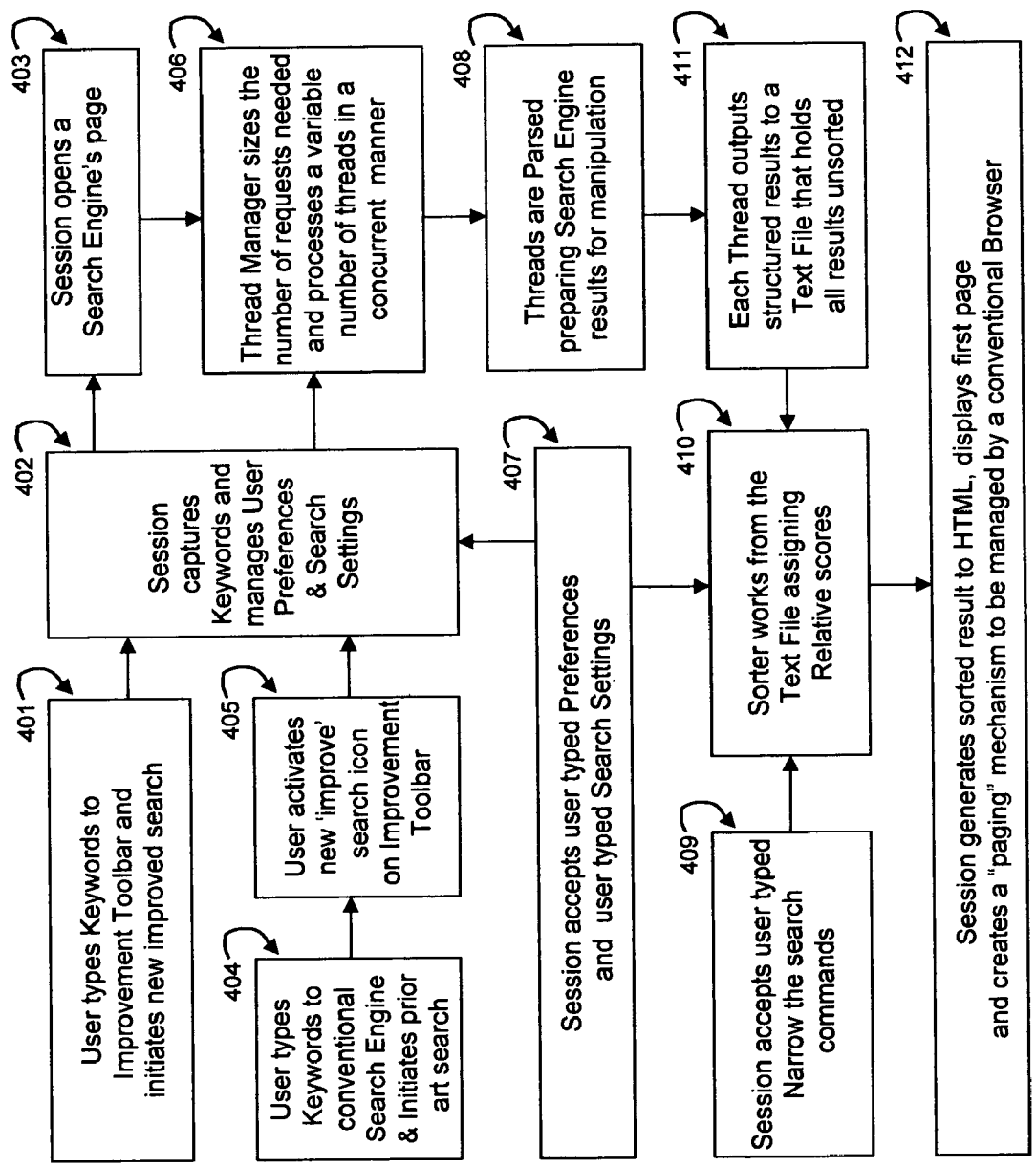
FIG. 4 shows the process steps for user controlled searches in the present invention.

FIG. 4 shows the process steps for user controlled searches in the present invention of an apparatus for performing the new method of user controlled search presentation for more relevant information retrieval. This figure illustrates how a user inputs various search related information 401, 404, 405, 407, and 409 which is then captured by the session search-boost software 402 and 440. The concurrent search request threads are managed 406, parsed 408, and then buffered 411 and sorted 410. The session results are then presented 412.

User Preferences 208 concerning aspects of how results are to be displayed on the searcher's display screen, for example, the number of results to be displayed per page, or whether a page opens to a new display window, may be changed via process step 407 at any time.

Search Settings 211 concerning weight factors to be in ranking, as well as filtering selections to enable or disable particular website extensions, and filtering selections to enable or disable particular file types, may be changed via process step 407 at any time. This control is dynamic and interactive and the searcher may adjust these Relevancy rankings in real time and the invention would be responsive to these adjustments without a necessity to go back to the Web Search Engine.

User Keywords 203 may be entered into the session from either of two means; using the conventional Web Search Engine or using the new search-boost software.

User Keywords 203 may be entered into the process steps 404, 405 path where Keywords are first input in process step 404 to a conventional Web Search Engine 106 and then afterwards the searcher activates process step 405 the improve search icon 206 located on the Improvement Toolbar Software 103. The activation method was described earlier.

User Keywords 203 may also be entered into the session via process step 401 by keying the data directly into the input window on the improvement toolbar managed by the improvement toolbar software 103.

Once activated in process step 402, the improvement toolbar software 103 starts. The improvement toolbar 103 is installed into the browser on the user's computer 101 in similar fashion to other toolbars. The improvement toolbar accepts inputs from the user and passes those inputs to the search-boost software 104. The improvement toolbar 103 also contains the activate switch or icon which may be used by the searcher to communicate that he or she has already input the required search terms. In the case where the search-boost software 104 is resident on the improvement server 110 as shown in FIG. 3, then the improvement toolbar communicates to the improvement server through the media manager—UC 301 on the user's computer and the media manager—IS 302 on the improvement server. On both sides the media managers, in this case, are serving as a communication aid. The keywords previously entered are acted on by the Thread Manager 207 in process step 403 as it initiates concurrent multiple thread requests to the Web Search Engine 106 assigning each unique page result to a thread for the Web Search Engine generated result based on the searcher provided keywords.

The steps to determine how many threads should be opened are as follows:
i. set the desired Web Search Engine 106 to display the maximum number of results per page, for example 100
ii. make at least one search request to the Web Search Engine 106
iii. select last link available in the list of search results provided by the Web Search Engine 106
iv. this will bring results which include, for example 701 to 747
v. parse this information to read the end number, 747.
vi. as the first 100 results are already known, and the last 47 results are already known, results for only 600 items need to be collected which can be satisfied by 6 additional requests. (The formula for the number of additional request to be made is: Additional Requests= (maximum number−100)/100

At process step 406 the Thread Manager 207 passes the various thread results through a text buffer 209 on the way to be parsed.

At process step 408 the results are parsed by the parser 210. Parsing includes removing any duplicate items or any similar items that link to the same website page areas. It also includes converting the data to a common internal format that can be used to manage results received from multiple Web Search Engines 106 and 108. In addition it involves eliminating any recognized advertising items received from the Web search Engine by ignoring them, or any other non relevant information.

At process step 411 the various parsed results are returned to the text buffer.

At process step 410 the parsed results are moved into the Score, Sort, and Show module where the current Search Settings 211 and User Preferences 208 are applied in order to calculate a ranking result for each item in the Results Set.

Either the Search Settings 211 or the User Preferences 208 or both may be altered by the searcher at any time after a search results are display by the present invention. In particular, changing search settings is dynamic and interactive and the searcher may adjust these Relevancy rankings in real time and the invention would be responsive to these adjustments without a necessity to go back to the Web Search Engine. After the searcher makes changes using the conventional browser 102 and activates the "Apply" icon 206 the changes are immediately used to rescore and resort all of the items in the Results Set. The number of members in the Results Set remains the same; the order of presentation of this would then reflect the changed search criteria. No communication with any Web Search Engine is required during this rescoring and resorting procedure.

At any time after search results are displayed by the present invention, the user may elect to use the "narrow the search" command 213. This allows the searcher to search within the search Results Set. This operation, depicted at process step 409, does not involve any communication with any Web Search Engine. This operation does not have the effect of reducing the Results Set. The narrow the search command 213 together with the Search Settings 211, the User Preferences 208, User Keywords 203, the User Preferences 208, individually and collectively represent examples of user inputs ("User Inputs").

After the Results Set have been scored and sorted at process step 410 by the Score, Sort and Show module 212, the results are formatted into HTML compatible display format in process step 412 and passed along to the browser 102 for display on the User's Screen 214.

Alternative Embodiments

FIG. 3 is a diagrammatic presentation of an apparatus for performing the new method of user controlled search presentation for more relevant information retrieval with software located on a remote server. In this embodiment of the present invention, the majority of the search-boost software 104 is located on a remote Improvement Server 110 computer. In this embodiment, compute intensive and bandwidth intensive search-boost software has been moved to the Improvement Server.

In this embodiment the Search-boost software 104 is resident on on a remote Improvement Server 110 computer. The Search-boost software 104, includes the Thread Manager 207, the Text Buffer 209, the Parser 210, and the Score, Sort, and Show routine 212. In addition, the Search-boost software 104 also manages User Keywords, User Preferences, User search Settings, and acts on receipt of other user commands. These components have been described earlier, and their operation is essentially the same in this embodiment except that this embodiment employs a Media Manager—IS 302. This additional module is discussed below. The purpose of this embodiment is to accommodate the smaller system resources of the User's computer.

In this discussion of the Search-boost software 104 we should discuss the tradeoffs as to where this software should be located; on the user's computer 101 as shown in the FIG. 2 embodiment, or on the Improvement Server 110 as shown in the FIG. 3 embodiment.

The tradeoff to locate the Search-boost software 104 in the User's Computer center around the throughput capabilities between that machine and the internet.

For user computers that are older, slower, and have narrow band connections to the internet and Web, compute intensive and bandwidth intensive search-boost software will execute at more acceptable speeds if it is located on the Improvement Servere 110 rather than the user computer 101. If the User's Computer supports a broadband connection via a TCP/IP based network, then it has sufficient system resources and capabilities to locate the Search-boost software 104 on this computer. The issue is one of communications bandwidth.

The operational characteristics of the present invention, as explained in reference to the FIG. 4 process flow, are identical between the present embodiment and a preferred embodiment discussed above. This embodiment does include media manager software which is divided between the user computer 101 and the improvement server 110.

Media manager-IS 302 is that portion of the media manager software which resides on the improvement server 110. Media manager-UC 301 is that portion of the media manager software which resides on the user computer 101. Together the two portions of the media manager software facilitate the transfer of data between the two computers, as it pertains to supporting the transfer of the displayable Results Set, as well as the transfer of the User Keyword 203 Search Settings 211, User Preferences 208, and Narrow Search Commands 213. For example, operation with a user computer with a browser, the displayable Results Set would be in HTML format. With respect to the operation of the Search-boost software 104, the operation of the Media Manager-IS 103 together with the Media Manager-UC 301 is simply a communications aid which allows the Search-boost software 104 to operate remotely from the User Computer 101. Those skilled in the art will recognize the generic purpose of a software program to control communications. The Media Manager software also provides for the management and transfer of advertisements between the Improvement Server 110 and the User Computer 101, however, the advertisement management operation is outside the scope of this patent.

Additionally, the two portions of the media manager software also act as a communications aid to provide for the transfer, temporary storage, and display of displayable advertising material to the user computer 101 from the Improvement Server 110.

Another aspect of the invention, is the use of Profiles. Profiles are selected by the searcher via the search settings inputs 211. Users can select from a plurality of pre-defined search formats.

These formats would contain pre-selections of specific search settings to help optimize or certain types of searches, for example, help optimize for finding a document or finding a link, or help optimize for an aggressive through search, or a shallow search. These different pre-defined search formats, or search profiles, (Profiles) are selectable by the user in an interactive manner.

Profiles allow the searcher the convenience of selecting a pre-defined set of Relevancy criteria. These sets of criteria are predefined and are known by the search-boost software 104. Profiles are stored sets of specific search settings accessible by a unique name. Acting on these known sets of criteria by the search-boost software 104, is equivalent to having the searcher specify each individual parameter in the set.

Profiles are defined to achieve a particular search style or objective. If a searcher is looking for a particular web site, he can select a Profile that helps optimize that intention. Examples of this might be restricting the search to the homepage and favoring the URL search category for the keywords. The searcher could achieve this with one click of the mouse. If a searcher is looking for files to download on a particular subject, he can select a Profile to help optimize that. Examples of this are shown below. The searcher can achieve this with one click of the mouse.

Different embodiments of some Profiles are described as follows:

---

WEBSITE Profile
    90% URL
    10% Title
    0% Description
    select Homepage only option
    select html file type group only
COMPANY Profile
    70% URL
    20% Title
    10% Description
    select Homepage only option
    select html file type group only
    select the set: .com, .org, .biz, .us, .net, .tv, only
PRODUCT Profile
    10% URL
    30% Title
    60% Description
    select all file types
    select all website extensions excepting .gov and .edu
SERVICE Profile
    20% URL
    20% Title
    60% Description
    select all file types
    select all website extensions excepting .gov and .edu
EDUCATION Profile
    50% URL
    25% Title
    25% Description
    select all file types
    select .edu only
GOVERNMENT Profile
    50% URL
    20% Title
    30% Description
    select all file types
    select .gov only

---

As those skilled in the art can appreciate these assignments for the specific profiles may change based on wider experience and practice. In addition, there is nothing to prevent customizing these profiles by combining the profile feature with the Context Point feature—which is defined later, and adding, for example, the keyword "specification" to the PRODUCT Profile.

An alternative embodiment for the Profile feature involves different sets of pre-defined words, or phrases, or portions thereof, (Pre-Defined Words). These words are stored within and loaded from the software. These words are manually selected to reflect associations with the specific Profile group, six of which groups were previously defined.

As an example, words or phrases or portions thereof that one might manually associate with the Profile, Company, are as follows.

& company
A. G.
AG
and company
Associates
Business
Certified
Commercial
Company
company history
company llc
company, llc Corporation
Group
Inc
Incorporated
Industrial
Institutional
K. K.
KK
Licensed
Limited
LLC
LLP
Ltd
management team
P. C.
Partners
Partnership
PC
S. A.
SA
Store location As can be observed from the list, these words were selected manually by just thinking about what words would be helpful in a Search Engine search relating to the specific Profile, Company. In addition to the different forms that a company may take as a legal entity, are included such terms as store location and certified as in different roles relating to a company one might reasonably expect to find these words or phrases or portions thereof. Those skilled in the art would have no trouble assembling a word list to associate with any of the Profiles.

Figure 8:
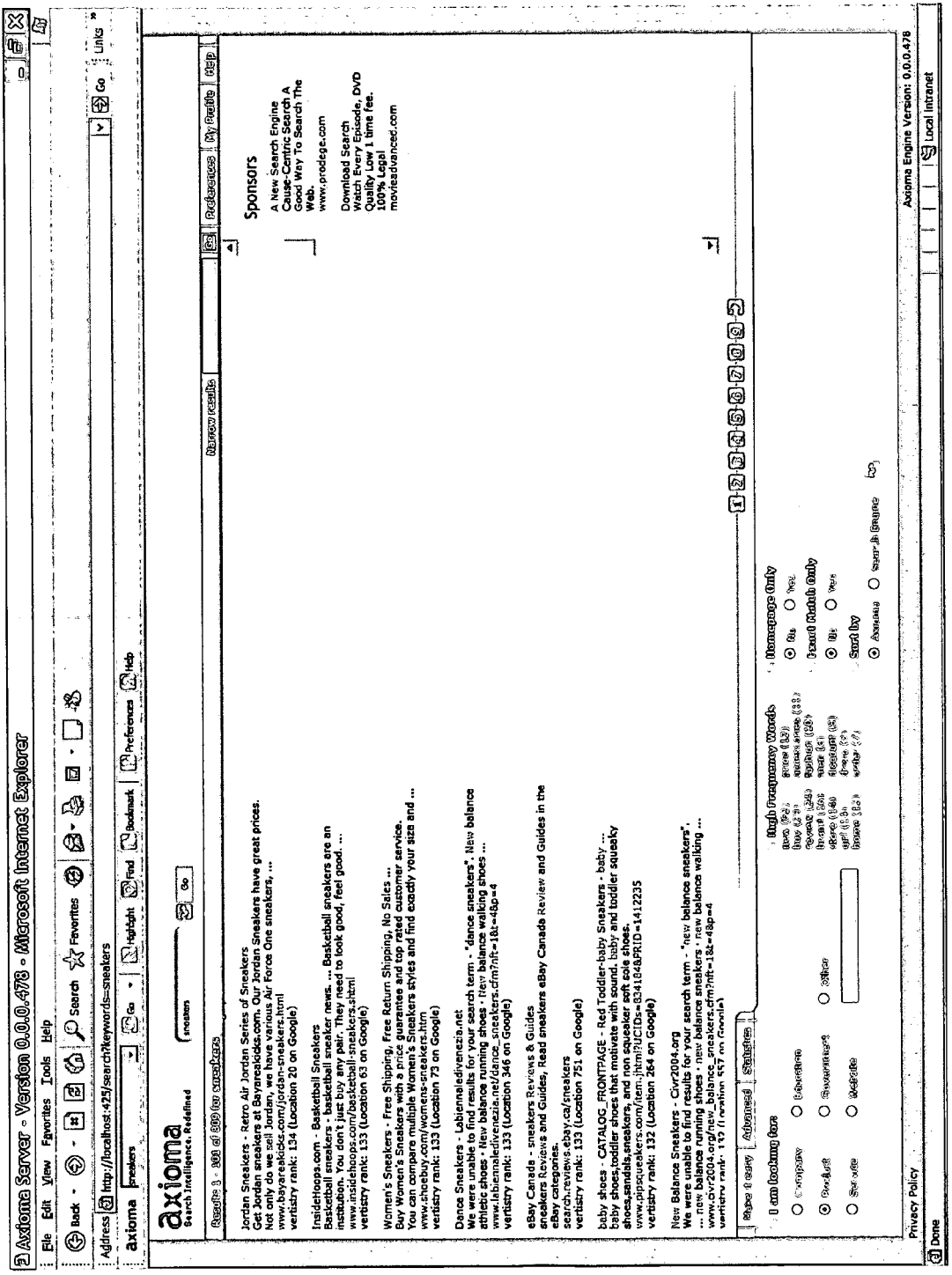
FIG. 8 depicts how the Pre-Defined Words might be displayed.

When the user selects and activates a specific Profile by means of the interactive manner search setting inputs 211, this causes a list of all Pre-Defined Words associated with the Profile to be searched across the Results Set. Any Pre-Defined Words that are matched are displayed along with the total number of urls where there is at least one match. This match list is presented in order of descending frequency of match counts. An example of how the Pre-Defined Words might be displayed is shown in FIG. 8. It is not intended to specify all possible display approaches. Note that each of the displayed Pre-Defined Words is also a hyper link as described shortly. It is understood that this example includes, but is not limited to, the display shown.

Scoring of this embodiment may be accomplished in at least five different ways. Method one: the urls may be scored as described previously and simply allow the Pre-Defined Words as an index to the specific url matches. This indexing is accomplished when only those Pre-Defined Words are displayed that match urls. Selection of an index occurs by clicking on the Pre-Defined Word. This causes only those urls to be displayed that have the specific Pre-Defined Word within it. Method two: the urls corresponding to the highest frequency of matches may be given some weighted score which values the higher frequency matches. Method three: the Pre-Defined Words may contribute to scoring when their occurrence in title, description, and url itself is given the same weight that the keyword is given as presented previously in the scoring discussion. Method four: the Pre-Defined Words are further associated each with a similarly selected subsidiary group of words and a search of the Title, Description and URL is performed to find the occurrence of these subsidiary words. If found they are likewise scored like method four and as previously discussed in the discourse on scoring. Method five: and combination of the previous four methods. Those skilled in the art will recognize that there are many equivalent ways of scoring. Our testing to date indicates that method three seems to yield the best results.

A sixth scoring mechanism of this embodiment may be defined using the distance in words between the search term or terms used and Pre-Defined Word.

An alternative embodiment of the Profile feature uses an auto generated word derived from the analysis of the aggregate search results received in response to the search term or terms. This analysis tabulates the frequency with which specific words or words might appear in a plurality of search results and use a high frequency score to select the auto generated words.

An alternative embodiment of the Profile feature allows for the search objective of selecting only certain one or more websites to be thoroughly and exclusively searched. In this implementation, the user selects a specific set of urls for this Profile by means of interactive search settings inputs 211. Each url of the Results Set is displayed with a selection button in this case. The button is either selected or not selected. The user can manually click the associated button for any site where a second search is to be executed. When the user supplies the search keyword and activates the search in the usual manner previously discussed, a search request is formatted for the Search Engine requesting the search of the specific sites. The format for this site specific request should adhere to the syntax format of the search engine used.

Another alternative embodiment of the Profile feature involves creating a plurality of a larger number of predefined profiles and dynamically deciding which profiles to display. The selection of which profiles to display or present would be according to how the profile scores of individual results correlate with the original scores of the search results.

Another aspect of the invention involves using cluster analysis techniques to extract meanings, nuances, and relationships from across a plurality of search results. These meanings are considered themes ("Themes") and they are represented by either single words or disjoint subsets of text.

For example the search term "Eisenhower" generates many search results. An analysis across these aggregate results finds that the terms 'President', "General', 'Dwight', 'David', 'war', among others, appear in high frequency relative to the aggregate results.

Figure 9:
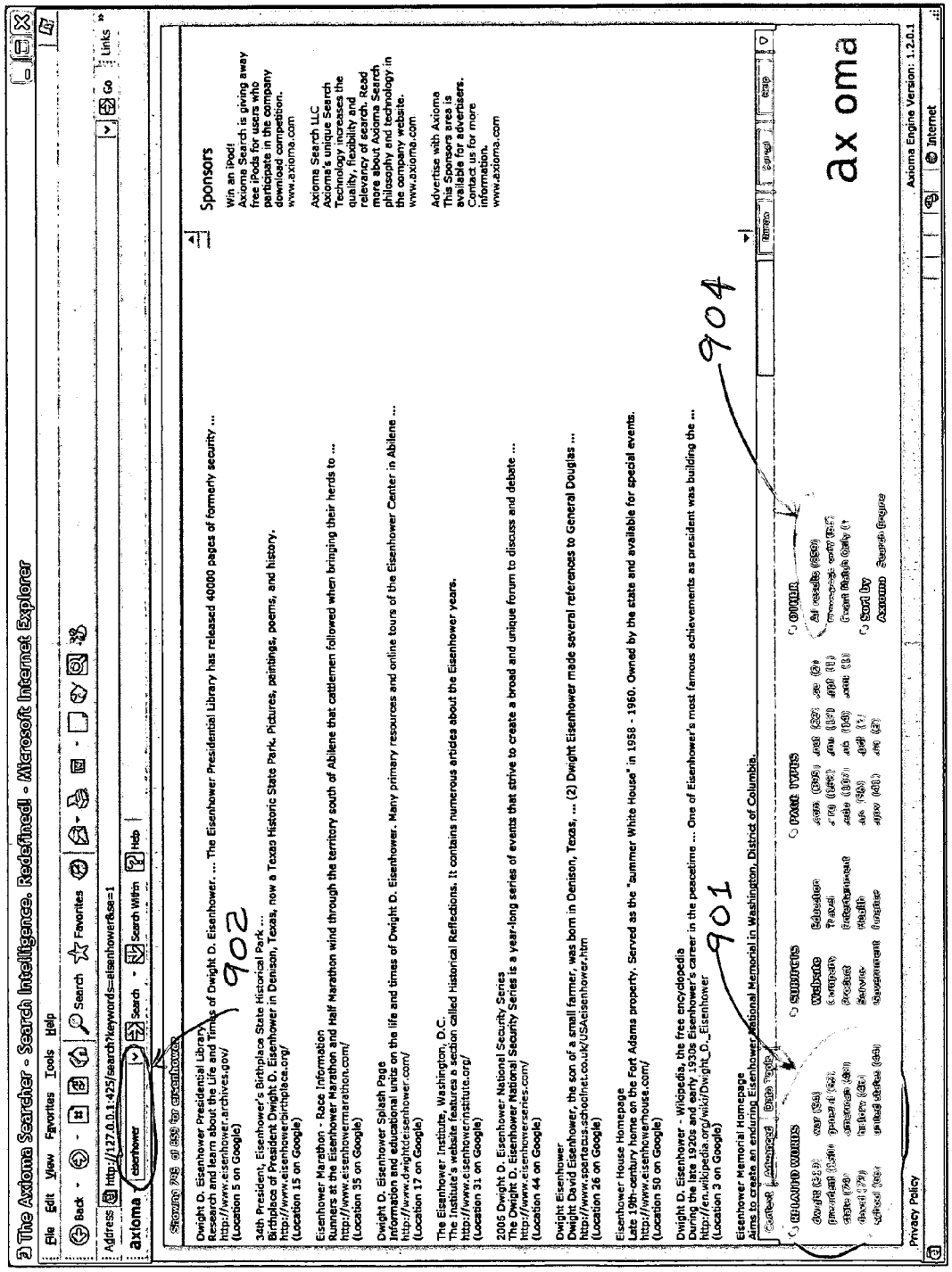
FIG. 9 depicts how the cluster words might be displayed.

An example of how the cluster words might be displayed, for search term 'Eisenhower', 902 is shown in FIG. 9. The cluster Themes are shown in this figure under the section titled 'related words' 901 on the lower left hand portion of FIG. 9. This figure is not intended to specify all possible display approaches.

There are many well understood means of clustering algorithms and heuristics such as joining and k-means, and other types of distance based clustering approaches. Those skilled in the art will recognize that any approach which yields acceptable results would be acceptable.

In an implementation of this embodiment we employ the following method. This method is based on first compiling a list of single cluster words, then a list of multiple cluster words, and then applying a cleanup. To support these list building techniques an ignore words list ("Ignore Words List") is employed where specific words such as "to", "and", "the", "a" etc are maintained and are therefore not used in the list building technique.

In the practice of this cluster method we do the following.

For each search which is the subject of one search string and which may generates a plurality of different url responses, those responses typically including a short title, a brief description and the actual url address itself:.

For each Search Result ("Search Result") which corresponds to a single set of data associated with a single url, and which set of data supplied by the Search Engine comprises title text ("Title"), description text ("Description"), and url text ("URL"):
  i. Break down the Search Result Title and Search Result Description into a list of words ("List of Words").
  ii. Create a new list, called the cluster candidates list ("Cluster Candidate List"), by adding each word to the Cluster Candidate List and the unique address of each word relative to the List of Words.
  iii. Alphabetically sort the Cluster Candidate List In processing single words ("Processing Single Words")
  1. For each Word ("Word") in the Cluster Candidate List that appears more then once,
     a. Add each instance of a Word to a newly created cluster list entry ("Cluster List Entry") where each Cluster List Entry contains the following three things:
        i. the Word,
        ii. the unique address of each occurrence of the Word in the List of Words, and
        iii. a frequency count associated with the number of times that the Word appeared in the Cluster Candidate List.
  2. Add each Cluster List Entry to a new list, the cluster list, ("Cluster List")

In processing multiple words
  1. The first step is to build a total of n separate n-word ("N-Word") lists where n ranges between 2 and the highest desired number of contiguous words in a cluster. In an embodiment of the present invention cluster lengths that ranged from 2 to 6 yielded acceptable results. Relevancy of these multiple word clusters depended on the subject matter searched where general searches favoured a limit of 2 or 3 words and more specific searches favoured 4 to 6 words.
  2. Build those n-word lists by examining each entry in the Cluster List together with the immediately preceding contiguous word. The immediately preceding contiguous word is located by using the address information for each entry in the Cluster List, together with the List of Words.
     a. After the N-Word lists are compiled, repeat the Processing Single Words steps treating each multiple word n-word entry as a single cluster.

Cleaning up single and multiple words
  i. Using the Ignore Words List remove any single ignore words from the Cluster List
  ii. Using the Cluster List create a new list, use cluster list, ("Use Cluster List") using the top 15 frequency scoring entries.
  iii. Using each N-Word List, create a new list, use n-word list, ("Use N-Word List") using the top 15 frequency scoring entries.
  iv. For each Use N-Word List
    1. Remove any entries where they do not contain single words from the Use (N−1) Word List
    2. Remove any entries where the unique frequency count of the multi-word is at least 80% of the unique frequency count of the single word
    3. IF both 1 and 2 from v. above are not satisfied, that is they do not cause the removal of the entry, then remove the single word from the Use (N−1) Word List
  v. Remove any entries of the search terms or subsets of it from each of the Use (N−1) Word List
  vi. Remove any entries where a multiple word list ends with a word from the Ignore Word List
  vii. Remove any entries where a single or multiple word entry is a plural of the singular form and adjust the frequency count.
  viii. From the remaining words in the Use (N−1) Word List, take the 4 most frequent multi-word words (if available), complete the list (up to 10 items) from the Use Cluster List.

An alternative embodiment of the Profile feature uses either the Pre-Defined Words or cluster Themes or both as additional search terms which are combined together with the original search term(s). These combined search terms are used to bring back a plurality of additional results which are used to help augment the specific profile selection. In this way the scope of the search could be expanded to include a wider body of results in a very easy way for the searcher. In practice this might be accomplished with a search query like: search term(s) Pre-Defined Word1 OR Pre-Defined Word2 OR . . . OR Pre-Defined WordN. In an implementation of this embodiment the number of results per combined search term was selected to be limited to 200.

Use of Pre-Defined Words needs to accommodate the chosen search language or languages.

Figure 10:
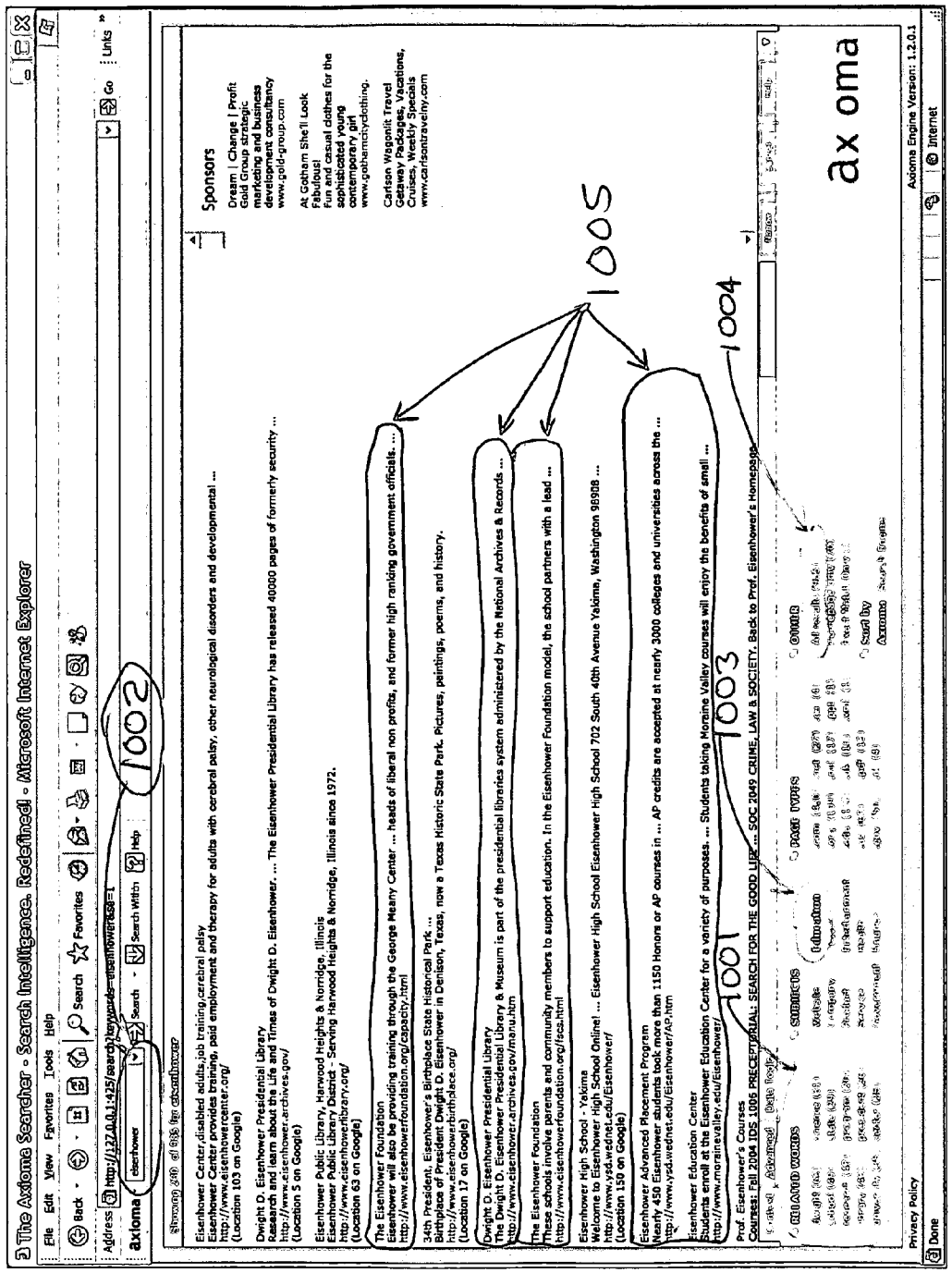
FIG. 10 depicts how results might be displayed when Pre-Defined Words are combined together with the original search term(s) and used as additional new search terms.

An example of how results might be displayed when Pre-Defined Words are combined together with the original search term(s), 'Eisenhower' 1002 as additional new search terms is shown in FIG. 10. The cluster Themes are shown in this figure under the section titled 'related words' 1001 on the lower left hand portion of FIG. 10, have been updated relative to 901 in FIG. 9, because the profile word, 'education' 1003 was selected by the user. Note that the display in FIG. 10 now has five urls without location data 1005. These five urls were added to the total results as a result of the additional new search terms. Note also that the 'all results' count is 985 in FIG. 10 label 1004, and was 859 on FIG. 9 label 904. This count increase, too, is due to the additional new searches of Eisenhower with the Pre-Defined Words associated with the profile subject 'education'. FIG. 10 is not intended to specify all possible display approaches.

An alternative embodiment of the Profile feature uses the cluster Themes selected by the searcher as an expand search ("Expand Search") capability. The system automatically marks and remembers which cluster Themes were selected by the searcher. If at any time afterwards the searcher activates the Expand Search button, the invention responds by automatically going out and combining Pre-Defined Words for this Profile with the different cluster Themes in the manner just described. In this way the invention or system implementation would be acting as a self managed search system.

Figure 5:
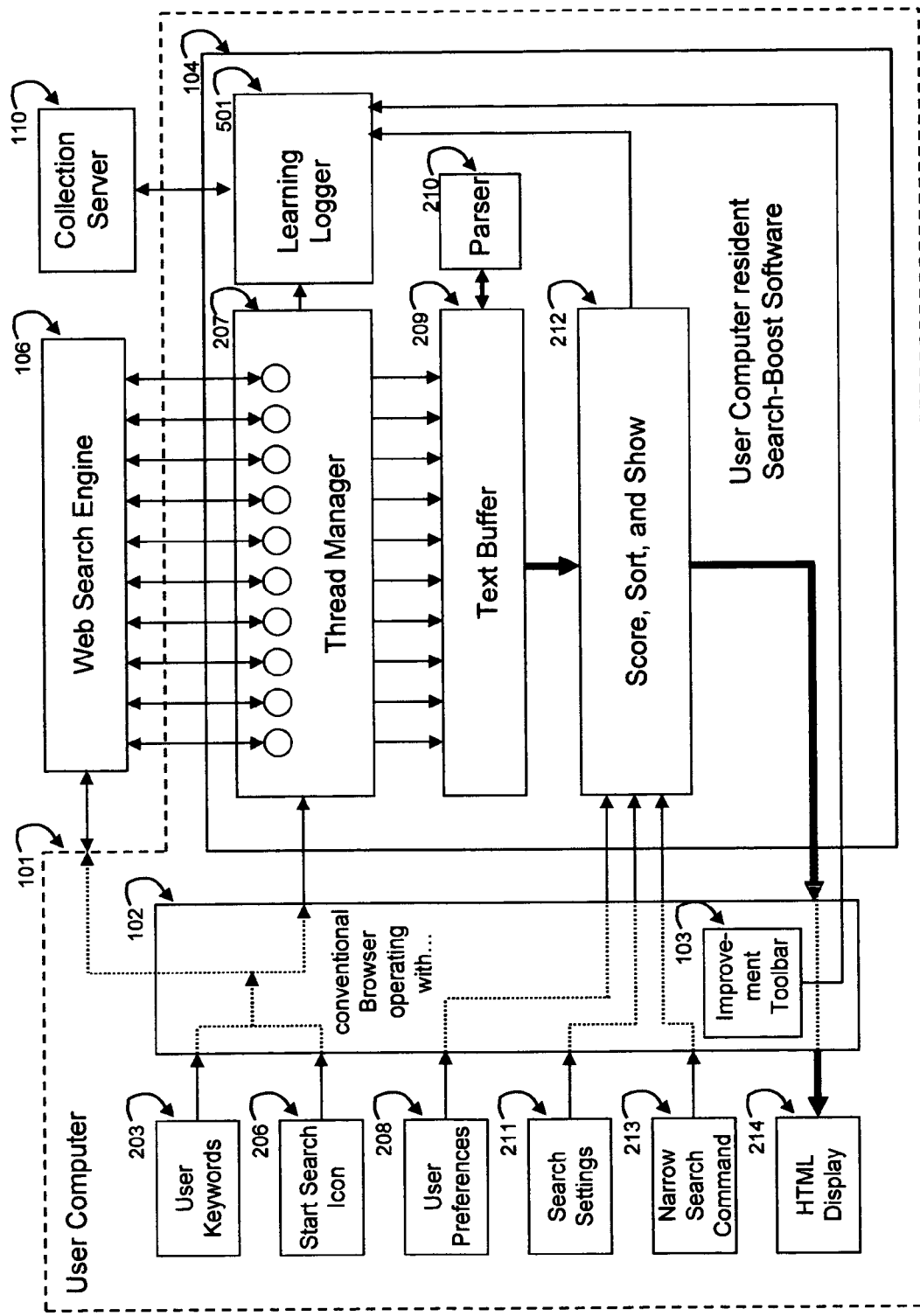
FIG. 5 depicts shows a block diagram of a search apparatus and system including learning logging as part of the present invention.

FIG. 5 depicts a preferred embodiment block diagram of the invention with the addition of a learning capacity. The Search-boost software 104, includes the Thread Manager 207, the Text Buffer 209, the Parser 210, and the Score, Sort, and Show routine 212, and a Media Manager—IS 302. In addition, the Search-boost software 104 also manages User Keywords, User Preferences, User search Settings, and acts on receipt of other user commands. These components have been described earlier, and their operation is essentially the same in this embodiment except that this embodiment employs a learning capacity. These additions include a learning logger 501 and a collection server 110.

The learning logger 501 software is part of the search-boost software 104 on the user computer 101. It accepts and formats inputs in a convenient storage format, from the, improvement toolbar 104, Thread Manager 207 and the score, sort and show 212 module. The inputs that are passed to the learning logger, from the improvement toolbar 104, and thread manager, document the user keywords 203, and search settings 211, and narrow search commands. The inputs that are passed to the learning logger, from the score, sort and show 212 module, document the type of request and timestamp. The learning logger captures the complete search history for analysis purposes and to recognize patterns and be able to offer alternative strategies and suggestions to the searcher. The search history is defined as all settings in effect at the time of the search, the keywords used in a search, all interactive manipulations used in evaluating search results, and a timestamp for each of these logged events. The capture of this history is defined as for any period of time, whether that time is of duration to do real time analyses and then discard the log, or whether the capture period is for months or longer. The collection of search related information is to help learn from user search interactions, of the interactive manipulation and display of search results variety. This learning will include the self learning variety, the results of which will be used to provide improved capabilities in the described search improvement process.

The learning logger 501 sends its logged results to the collection server 110 which is co-resident with the improvement server 110. Logged data is then aggregated for later analysis. This analysis would include, but not be limited to, (1) an association between multiple searches and like or similar keywords input by the searcher and used to eventually satisfy the searcher.
(2) the amount and types of search analysis manipulations performed by the user on the search results; ie how did the searcher use the invention to interactively investigate the search results,
(3) statistics on the time of a particular search session, from the receipt of first results to the last manipulation of those results, and the number, type, and duration of page views during that session.
(4) understanding the scope of keyword terms that a variety of searchers use to search for related items.
(5) take into account using Web Site sites that a variety of searchers suggest or use to search for related items.
(6) take into account using Web Site sites that are similar to the one provided or found. Using a process such as, many of Web site "A" visitors also went to Web site "B" and "C"; therefore Web site "B" and "C" might be appropriate sites to search.
(7) account for user acceptance of an element from the Results Set, by valuing whether or not specific elements are selected.
(8) use explicitly derived searcher feedback as when they select a choice to communicate that the specific results are useful or not useful in some way.
(9) use thesaurus references and other context indexes to generate similar keywords for searching.

Figure 7:
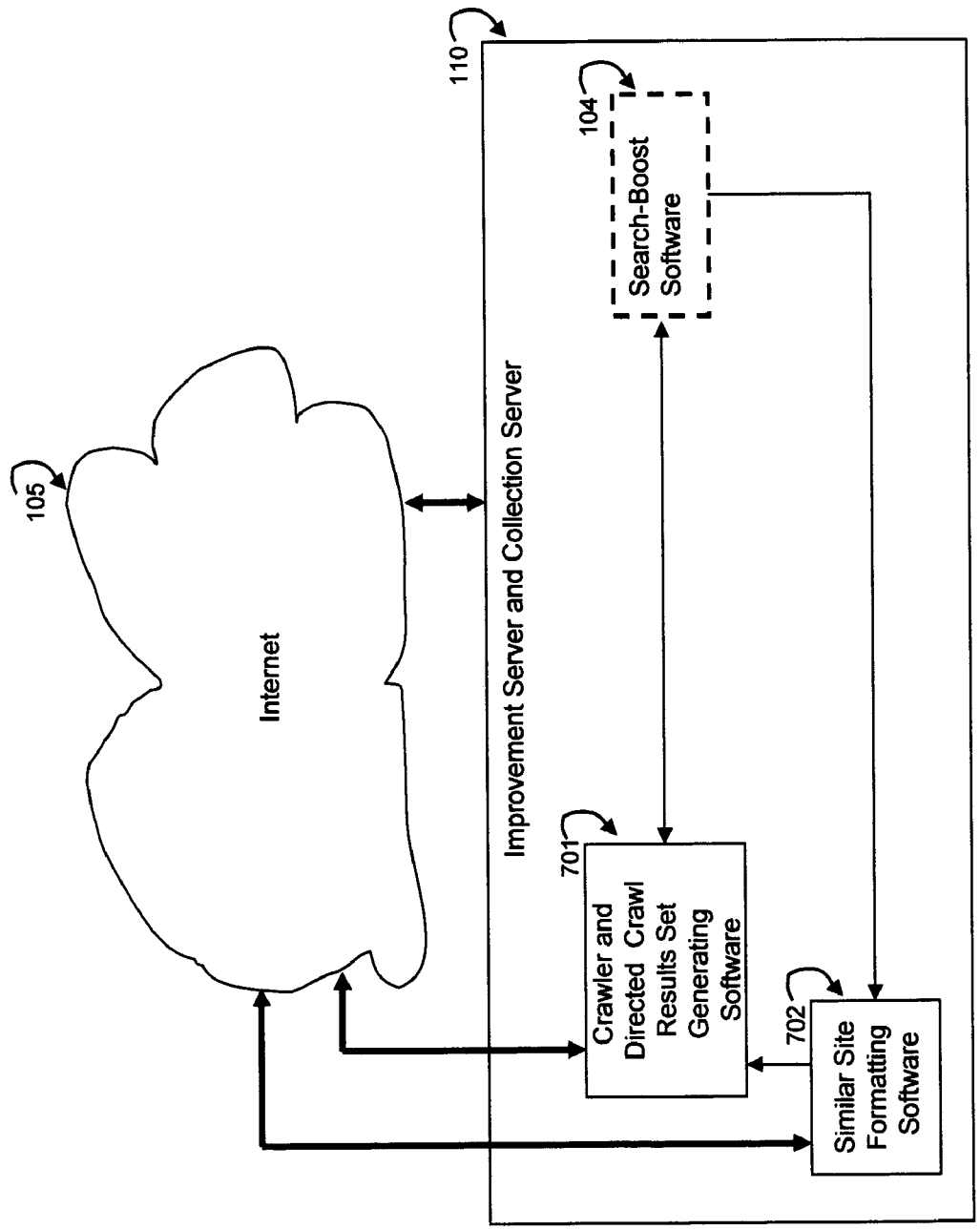
FIG. 7 depicts how the Directed Crawl feature is integrated into the present invention.

FIG. 7 depicts how the Directed Crawl feature is integrated into the present invention. Elements 105, the internet, and 110, the improvement server and collection server, and 104, the search-boost software, are included from FIG. 1 discussed earlier. Elements 701 the Directed Crawl Results Set generating software, and 702 the similar site formatting software are discussed below.

The operation of Directed Crawl requires that it make requests over the internet, format the data that is returned, and then pass that information along to the search-boost software to be handled in the previously described manner of the invention, described earlier. Directed Crawls, are targeted to sites which have been selected by the searcher or specifically supplied by the searcher. In addition, the searcher may supply a plurality of keywords and/or keyword combinations, to be used in the Directed Crawl.

In terms of input, the Directed Crawl feature obtains inputs via the present invention's search settings 211 capability shown in FIG. 3. Whenever the Directed Crawl feature is selected by the searcher in the Search Settings 211, the Search-boost software 104 transfers a copy of the necessary inputs as follows. These inputs would be of two parts. Part 1 of the inputs may be of the form of a URL location itself, or upload information about a file containing URL information. Part 2 of the inputs may be keywords and combinations of keywords, or upload information about a file containing desired Keyword information. This input information is transferred to improvement server via 110 the invention's previously described Media Manager communication agent.

The user specified URLs to be searched, the part 1 inputs discussed earlier, are passed to the Similar Site Formatting Software 702. These URLs are temporarily stored and then formatted and passed to the Crawler and Directed Crawl Results Set Generating Software 701.

The desired keyword criteria to use in that search, the part 2 inputs discussed earlier, are passed to the Crawler and Directed Crawl Results Set Generating Software 701.

When the Crawler 701 has both at least one site to be searched as well as all keyword criteria to be used, it initiates crawls and searches of the identified Web sites using the search criteria passed to it. It initiates concurrent crawls of multiple Web sites.

As information from the Crawler searches is returned it is formatted by the Results Set generating software into the same format used by the invention's Results Set. These results are transferred to the search-boost software to be processed in the invention's usual manner described earlier, An additional aspect of the Directed Crawl feature is a capacity to also search Web similar sites to that being specified by the searcher. This means investigating a site's related link information. This information shows that for people who visited the requested site, what additional sites did they also visit shortly before or shortly after. If the user has previously selected this option via the search settings 211 inputs, then this capability will engage. The search-boost software 104 will notify the Similar Site Formatting Software 702 to activate.

When activated, the Similar Site Formatting Software 702 will go out to Alexa.com, or a similar Web site, and present the requested site and obtain the related link information from Alexa. This information will be parsed to obtain the URL information and any new links, or URLs, will be passed to the Directed Crawl Results Set Generating Software 701 for inclusion into its crawling. New links are determined by comparing the links received from Alexa to the previously stored temporary list of URLs identified earlier.

Another aspect of the invention, is allowing the user to interactively provide additional keywords that act as seeds for context or cluster points and thereby allow the manipulation and display of results from at least one Web Search Engine.

Earlier we present a list of website extensions and file types that serve as filters. Recall that, as discussed earlier, when the Results Set is displayed hyper link points are displayed for various filters. Searchers may click on those hyperlinks and investigate only the results that are associated with a specific filter. For example, if the Results Set contains 17 .xls files the searcher could click on the hyperlink 17 associated with .xls and then view and investigate that specific set of 17 links.

We define context points ("Context Points") as searcher or user supplied suggestions that would effectively act as custom filters and would operate in the same manner that was previously described for filters. Note that, like filter points, Context Points are not explicitly submitted to the Search Engine. Rather, they are used as secondary sort points after the results are received based on the keyword search.

Searchers would specify their submission of their Context points using the Search Settings 211 capability communicated via the improvement toolbar 103. The Score Sort and Show module 212 would then operate with any user or searcher supplied Context Points as if it were one of the standard filters discussed earlier.

With this Context Point capability, searchers would be able to go rapidly and efficiently satisfy their search requirements. For example, when searching for the keywords, 'hot chocolate' the searchers might identify the following Context Points: (i) popularity (ii) recipe, (iii) calories, (iv) coffee tea, and (v) history. Then the searcher submits the search and might receive something like the following results, displayed here for explanation purposes, not for display presentation purposes.

Keywords specified: Hot Chocolate Total Unique Results: 585

| Website Extensions | File Types | Context Points (user supplied) |
|---|---|---|
| 299 .com | 508 .html | 26 popularity |
| 53 .org | 19 .pdf | 45 recipe |
| 67 .net | 26 .doc | 38 calories |
| 36 .biz | 5 .ppt | 19 coffee tea |
| 42 .edu | 2 .xls | 5 history |
| 12 .gov | 16 .rtf | |
| 70 .us | 9 .ps | |
| 6 .tv | | |

The utility to the searcher from the combination of filters and Context Points is quite evident from the previous paragraph. The searcher specifies his Context Points and Search Keywords and submits them. Before the searcher needs to look at even a single result, he or she knows how the 585 results breakdown with respect to website extensions, file types, and the Context Points that were supplied by the searcher. If the searcher wishes to begin his or her investigation of the results by looking at the results that contain the term, history, then the searcher can achieve that by clicking on the number 5 next to the word history.

The searcher can dynamically and interactively use the subject invention as an analysis tool that pre-analyzes the full set of search results that are available, and categorizes those results not only in useful categories, but also according to categories defined by the searcher. In this way searchers can get to results with Relevancy much faster than by using only the prior art Web Search Engine without the benefit of the invention.

Specifying a Context Point does not discard any items from future consideration or manipulations or selections from that particular Results Set. There is nothing mutually exclusive about selecting a specific file type, that would exclude simultaneous consideration of other specific file types. Searchers would benefit from being able to manipulate results by including or excluding certain file types.

Nothing in this specification should be understood to limit this invention to the required use of a toolbar. The toolbar is merely an example of a convenient input device. Other useful input devices might be voice activation, or some scheme that tracks the retina movement or other movements of the searcher's eye, and it is very conceivable that in the near future this invention might accept input from an appliance such as a refrigerator or washer, or any other kind of convenient input device.

Nothing in this specification should be understood to limit this invention with the operation of a WEB browser. The browser is merely an example of a convenient search interface facilitator. Other useful interface facilitators might be an application that manages an email system, or a system or application that manages a data or file storage system. Indeed the principles of this invention might be directed to assisting searches of an email system in which case it might be useful to install the improvement toolbar on an email display screen such as Microsoft's Outlook for example, or use some other method of input. Or alternatively, the principles of this invention might be applied to assisting searches of a local disk drive, or a Network Attached Storage, NAS, device, or a Storage Area Network, SAN system, or some other storage system.

In summary, the present invention presents an apparatus and system for providing, to Web searchers, an ability to interactively prescribe rank weightings and other search setting criteria that could be applied to the current result set and thereby increase the Relevance of search results. Searchers can dynamically and interactively examine and manipulate the search results to improve Relevance and quickly satisfy their search objectives. This invention introduces a secondary, temporary, searchable database for the purpose of interactive manipulation and display of search results. These results may be dynamically reviewed interactively by the searcher as they vary the non-keyword search input criteria. This secondary database may be comprised of the Results Set provided by the Web Search Engine in response to any keywords provided by the searcher. This set is then parsed and scored using search setting inputs provided by the user, then sorted and prepared for display purposes. Varying the non-keyword search input criteria will cause the invention to be responsive to a new set of searcher Relevancy criteria and the Results Set will be re-sorted and re-presented to the searcher without making any request to the Web Search Engine. Those skilled in the art will appreciate that the present invention is not limited to internet Web Search Engines, but rather includes the general case of providing higher relevance for pre-ranked, massive databases. The invention provides for obtaining additional information such as domain information, web extension information, file type information, and making this available to the user. It provides the user a means to specify customized terms to be used as context or cluster seeds. It allows a user to request a Directed Crawl search be performed. It also vastly reduces the time a searcher needs to get to the specific result.

The invention claimed is:

1. A search system for providing user controlled relevance ranking of search results received from an internet web based search engine, and operating in conjunction with a conventional browser, comprising:

means for accepting keywords and at least one of different specific User Inputs from the search user to request search results;

means for determining the size of the set of requested search results to be provided by the search engine to the search user, or for determining the size of the set of requested search results to be provided by the search engine to the search user by interactive action between a managing program and the web search engine, when the search results exceed a preset number;

means for acquiring the size of the set of requested search results and for formatting and managing multiple parallel near simultaneous search requests of the search engine to increase the selected responses when they exceed said preset number;

means for parsing the selected responses of the search results received from the search engine by removing duplicate and extraneous information to display parsed information;

means for applying a scoring algorithm to the parsed search results received from the search engine to rank the search results, which incorporates search setting information supplied from the search user;

means for dynamically or interactively focusing the search results, and causing the search results to be re-ranked, without going back to a search engine; and means for formatting the sorted search results into a display format for display on the user's computer operating in conjunction with a conventional browser.

2. A search system according to claim 1, further including means for storing and using pre-defined words each of which may be independently associated with a user's search term and automatically sent to the search engine to add to search results and further including means for scoring or ranking the combined results.

3. A method for searching by providing user controlled relevance ranking of search results received from an internet web based search engine, and operating in conjunction with a conventional browser, comprising the steps of:

a) inserting keywords and accepting at least one of different specific User Inputs from the search user to request search results;

b) the search system selecting the size of the set of the requested search results to be provided by the search engine to the search user, when search engine results exceed a preset number, or the search user selecting the size of the set of the requested search results to be provided by the search engine to the search user;

c) the search system inserting additional near simultaneous search requests into to the search engine to increase the selected responses when they exceed said preset number to provide combined search results;

d) parsing the selected responses of the combined search results received from the search engine to remove or discard duplicate and extraneous information to create parsed information;

e) applying a scoring algorithm to the parsed information received from the search engine to rank the search results, which utilizes said search setting information supplied by the search user;

f) sorting the search results received from the search engine in order list the parsed search results by the highest relevant score;

g) allowing the user to dynamically and interactively manipulate the search results, without going back to the search engine, by varying user search setting inputs; and h) formatting the sorted results for display on the users computer for operating in conjunction with a conventional browser.

4. A method for searching according to claim 3, further including the steps of storing and using pre-defined words each of which may be independently associated with a user=s inserted search term request and automatically sending the search term to the search engine to add to the search results and further including the step of scoring or ranking the combined search results.

5. A method for searching according to claim 3, further including the step of providing user-controllable relevance ranking of search results from two or more search engines.

6. A method for searching according to claim 3, further including the step of providing a profile feature by accepting as profiles automatically generated cluster themes, or pre-defined words, or both.

7. A search system according to claim 1, wherein the search system includes means for providing user-controllable relevance ranking of search results received from two or more internet web based search engines.

8. A search system according to claim 1, wherein the search system includes means for logging User Inputs.

9. A search system according to claim 1, wherein the parsing means includes additional means for translating the responses to a different language or linguistic system, or particular format or a particular database format.

10. A search system according to claim 1, wherein the means for accepting user inputs is incorporated on to a single main page.

11. A search system according to claim 1, wherein the means for accepting user inputs includes multiple levels of filtering including file types and website extensions, and means for presenting these results with filter frequency annotations.

12. A search system according to claim 1, wherein the means for accepting user inputs includes user defined context points.

13. A search system according to claim 1, wherein the means for accepting user inputs incorporates a learning logger capability.

14. A search system according to claim 1, wherein the means for accepting user inputs includes a homepage containing user specified search criteria.

15. A search system according to claim 1, which includes means for directed crawling.

16. A search system according to claim 1, which includes means for profiling.

17. A search system according to claim 1, wherein the search system includes means for automatically generating cluster themes for the search results, or profiles, or both.

18. A search system according to claim 1, wherein the search system includes means for restricting searching to one, or a fixed plurality, of websites.

19. A search system according to claim 1, wherein the search system includes means for automatically searching a plurality of search engines and using the combined ranking from these search engines to generate a new ranking order.

20. A search system according to claim 1, wherein the search system includes means for automatically managing a plurality of profiles and dynamically deciding which profiles to present for display based on scoring.

21. A search system according to claim 1, wherein the search system includes means for automatically expanding the search request based on selected pre-defined words, or cluster themes selected, or both.

22. A search system for providing user controlled relevance ranking of search results received from a large database search system, and operating in conjunction with a conventional browser, comprising:

means for accepting keywords and at least one of different specific User Inputs from the search user to request search results;

means for determining the size of the set of requested search results to be provided by the database search system to the search user, or for determining the size of the set of requested search results to be provided by the database search system to the search user by interactive action between a managing program and the database search system, when the search results exceed a preset number;

means for acquiring the size of the set of requested search results and for formatting and managing multiple parallel near simultaneous search requests of the database search system;

means for parsing the selected responses of the search results received from the database search system by removing duplicate and extraneous information to display parsed information;

means for applying a scoring algorithm to the parsed search results received from the database search system to rank the search results, which incorporates search setting information supplied from the search user;

means for dynamically or interactively focusing the search results, and causing it to be re-ranked, without going back to a database search system; and means for formatting the sorted search results into a display format for display on the user's computer operating in conjunction with a conventional browser.

23. A search system according to claim 22, wherein the search system is capable of providing user-controllable relevance ranking of search results received from two or more database search systems.

24. A search system according to claim 22, wherein the parsing means includes additional means for translating the responses to a different language or linguistic system, or particular format or a particular database format.

25. A search system according to claim 22, wherein the means for accepting user inputs includes user defined context points.

26. A search system according to claim 22, wherein the search system includes means for automatically generating cluster themes.

27. A search system according to claim 22, wherein the search system includes means for accepting as profiles, automatically generated cluster themes, pre-defined words, or both.

28. A search system according to claim 22, wherein the search system includes means for automatically managing a plurality of profiles and dynamically deciding which profiles to present for display based on scoring.

* * * * *